(12) United States Patent
Miyabara et al.

(10) Patent No.: US 12,454,813 B2
(45) Date of Patent: Oct. 28, 2025

(54) OPERATION CONTROL SYSTEM OF WORKING VEHICLE

(71) Applicant: TAKEUCHI MFG. CO., LTD., Nagano (JP)

(72) Inventors: Kazuhiro Miyabara, Sakaki-machi (JP); Shingo Takeuchi, Sakaki-machi (JP); Yutaro Yamazaki, Sakaki-machi (JP)

(73) Assignee: TAKEUCHI MFG. CO., LTD. (JP)

( * ) Notice: Subject to any disclaimer, the term of this patent is extended or adjusted under 35 U.S.C. 154(b) by 0 days.

(21) Appl. No.: 18/820,517

(22) Filed: Aug. 30, 2024

(65) Prior Publication Data

US 2025/0137234 A1 May 1, 2025

(30) Foreign Application Priority Data

Oct. 30, 2023 (JP) ................. 2023-185278

(51) Int. Cl.
*E02F 9/22* (2006.01)
*E02F 9/20* (2006.01)
*E02F 9/26* (2006.01)
*F15B 15/20* (2006.01)
*G05B 6/02* (2006.01)

(52) U.S. Cl.
CPC .......... *E02F 9/2253* (2013.01); *E02F 9/2004* (2013.01); *E02F 9/2203* (2013.01); *E02F 9/26* (2013.01); *F15B 15/20* (2013.01); *G05B 6/02* (2013.01)

(58) Field of Classification Search
CPC ...... E02F 9/2203; E02F 9/2253; F16H 61/47; F15B 15/20
See application file for complete search history.

(56) References Cited

U.S. PATENT DOCUMENTS

2014/0144129 A1\* 5/2014 Shirao .................. F15B 15/20
60/459
2015/0345113 A1\* 12/2015 Lim .................... F16H 61/456
701/50
2017/0241448 A1\* 8/2017 Kondo .................. F16H 59/36
2020/0071911 A1\* 3/2020 Sato ..................... F16H 61/44

FOREIGN PATENT DOCUMENTS

JP         2022056577 A      4/2022

\* cited by examiner

*Primary Examiner* — Abiy Teka
(74) *Attorney, Agent, or Firm* — Harness, Dickey & Pierce, P.L.C.

(57) ABSTRACT

An operation control system includes a control device having a hydraulic pump control unit that controls a hydraulic pump based on a level that an operator selects from levels in n stages (n being an integer of 2 or more). The hydraulic pump control unit has operation distance/current value corresponding data where an operation distance of an operating lever and a current value are made to correspond to each other in a corresponding manner with each level in the levels in n stages. A current value that corresponds to an operation distance of the operating lever at a present point of time is acquired from the operation distance/current value corresponding data that corresponds to the level that the operator selects, and controls the discharge amount of a pressurized oil that the hydraulic pump discharges based on the acquired current value.

13 Claims, 10 Drawing Sheets

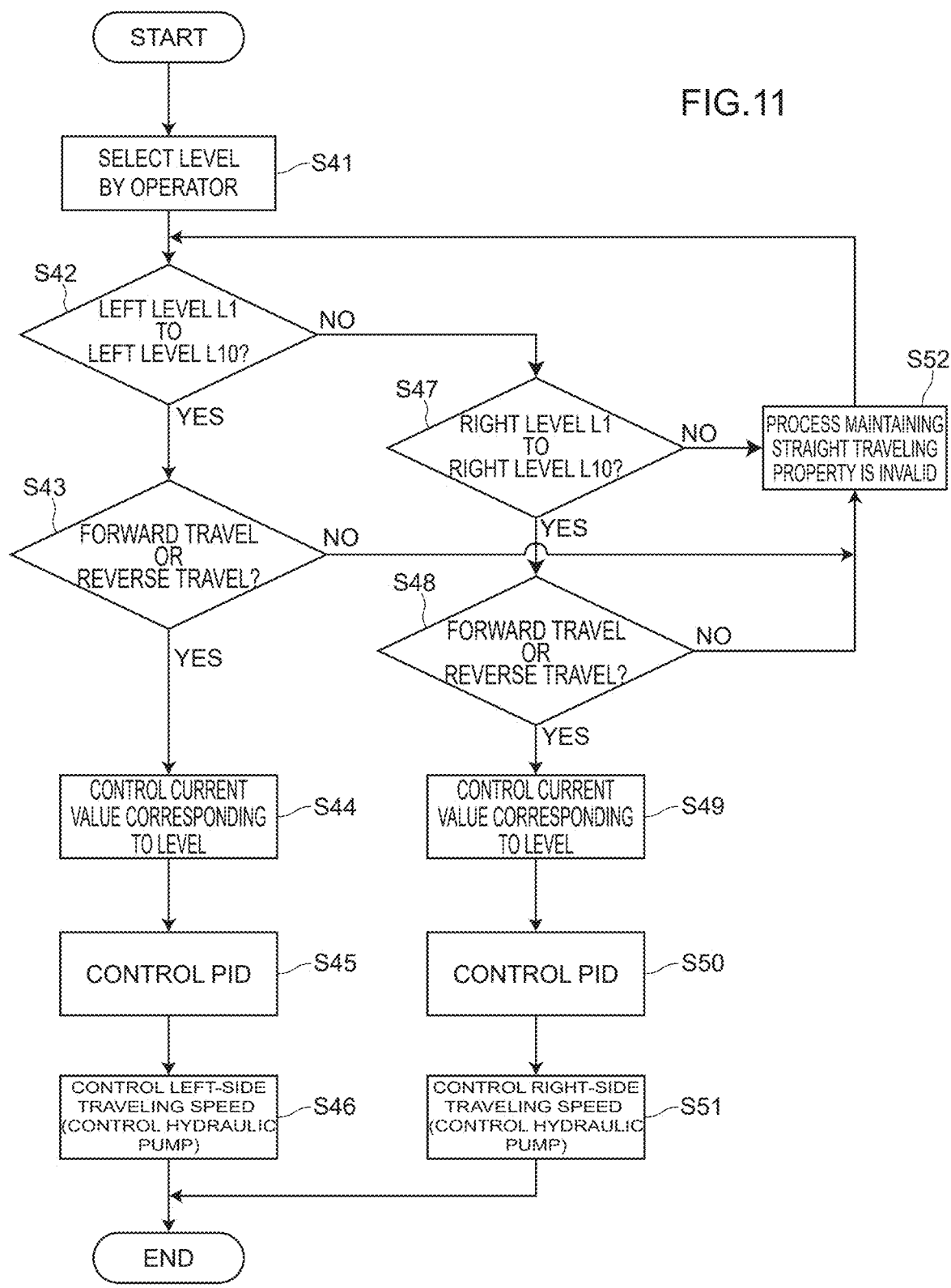

OPERATION CONTROL SYSTEM OF WORKING VEHICLE

CROSS REFERENCE TO RELATED APPLICATIONS

This application claims priority to Japanese Patent Application No. 2023-185278, filed on Oct. 30, 2023, which is expressly incorporated herein by reference in its entirety.

BACKGROUND

Technical Field

The present invention relates to an operation control system of a working vehicle.

Background Art

As a working vehicle, there has been widely known a crawler-type skid stair loader. In such a working vehicle, an attachment such as a bucket is detachably mounted on a distal end of an arm that is vertically movably mounted on a vehicle body. Then, by tilting the bucket vertically, for example, it is possible to perform various works such as movements of soil and sand that are excavated. By detachably exchanging the attachment according to an intended purpose, various works can be performed.

Further, this type of working vehicle is provided with a cabin in which an operator rides on an upper portion of the vehicle. A seat on which the operator is seated is disposed in the cabin. In the vicinity of the seat, an operating lever for performing a traveling operation of the working vehicle, and an operating lever for operating the attachment such as a bucket are disposed (see JP-A-2022-56577).

In the working vehicle described in JP-A-2022-56577, when the operator performs a traveling operation of the working vehicle or performs an operation of the attachment such as a bucket, the operator can perform a desired operation by operating the ns that are provided to the respective operations.

In the above-mentioned working vehicle, there has been a demand that an operating unit of the working vehicle is performed after an operation speed is limited to an operation speed desired by the operator. Particularly, with respect to an operator who has not enough skill in operation of the working vehicle, there may be a case where such an operator cannot perform the operation with margin when an operation speed of the operation unit is fast. Accordingly, the operator who has not enough skill in operation of the working vehicle has a desire that he/she wants to operate the operation unit of the working vehicle at an operation speed that conforms to his/her skill or the content of an operation. In the above-mentioned description, the operation unit of the working vehicle indicates a traveling device for making the working vehicle travel and a working equipment for performing works. The traveling device includes crawlers, hydraulic motors f traveling and the like. The working equipment includes an attachment such as a bucket, a hydraulic cylinder and the like.

In making the working vehicle travel straight, in a case where either left or right crawlers is worn out or sand and soil are loaded unevenly in a bucket, there is a possibility that the working vehicle turns in a direction not intended by an operator. In such a case, it is necessary for the operator to perform an operation for correcting the advancing direction of the working vehicle. However, there may be a case where the operator who has not enough skill in operation of the working vehicle cannot properly correct the advancing direction.

All of the control of the traveling speed of the working vehicle, the control of the operation speed of the working equipment and the control for maintaining the straight traveling property of the working vehicle, as described above, can be performed by controlling the operation speed of the operation unit of the working vehicle. In this case, if it is possible to limit the operation speed of the operation unit of the working vehicle, even the operator who has not enough skill in operation of the working vehicle can perform the operation with margin.

The present invention has been made to overcome the above-mentioned drawbacks, and it is an object of the present invention to provide an operation control system of a working vehicle where, by allowing an operator to perform a simple operation of selecting a level that conforms to his/her skill or the content of an operation from a selection screen displayed on a display unit, an operation speed of an operation unit of a working vehicle can be limited and hence, even an operator who has not enough skill in operation of the working vehicle can perform an operation of a working vehicle with a margin.

SUMMARY

[1] An operation control system of a working vehicle according to the present invention is an operation control system of a working vehicle that performs an operation control of an operation unit by controlling a hydraulic pump based on a current value outputted by operation of an operating lever. In such an operation control system of a working vehicle, levels in n stages (n being an integer of not less than 2) ranging from a first level to an nth level are set with respect to an operation speed at a time that the operation unit is operated.

The operation control system of a working vehicle according to the present invention includes: the hydraulic pump; a display unit that displays a selection screen for allowing an operator to select any level among the levels in n stages; and a control device having a hydraulic pump control unit that controls the hydraulic pump based on the level that the operator selects. The hydraulic pump control unit limits the current value corresponding to the level that the operator selects, and controls a discharge amount of a pressurized oil discharged from the hydraulic pump based on the limited current value.

[2] It is preferable that the operation control system of a working vehicle of the present invention further have the following configuration. The operation control of the operation unit is a traveling speed control that controls a traveling speed of a traveling device that the working vehicle includes, and levels in n stages ranging from a first level to an nth level are set with respect to the traveling speed of the traveling device. The operation control system of a working vehicle according to the present invention includes a hydraulic motor for traveling that is driven by a pressurized oil discharged from the hydraulic pump. The hydraulic pump control unit has operation distance/current value corresponding data where an operation distance of the operating lever and the current value are correlated to each other, in a manner of corresponding to each level of the levels in n stages, and acquires a current value that corresponds to an operation distance of the operating lever at a present point of time based on the operation distance/current value corresponding data that corresponds to a level selected by the operator. Then, the hydraulic pump control unit controls a discharge amount of a pressurized oil discharged from the hydraulic pump based on the acquired current value.

[3] It is preferable that the operation control system of a working vehicle of the present invention further has the following configuration. The operation control of the operation unit is an operation speed control of the working equipment that controls an operation speed of the working equipment that the working vehicle includes, and levels in n stages ranging from a first level to an nth level are set with respect to the operation speed of the working equipment. The operation control system of a working vehicle according to the present invention includes a hydraulic cylinder that is driven by a pressurized oil discharged from the hydraulic pump. The hydraulic pump control unit has operation distance/current value corresponding data, where the operation distance of the operating lever and the current value are correlated to each other, in a manner of corresponding to each level of the levels in n stages, and acquires a current value that corresponds to an operation distance of the operating lever at a present point of time based on the operation distance/current value corresponding data that corresponds to a level selected by the operator. The hydraulic pump control unit controls a discharge amount of a pressurized oil discharged from the hydraulic pump based on the acquired current value.

[4] It is preferable that the operation control system of a working vehicle of the present invention further have the following configuration. In the operation distance/current value corresponding data that corresponds to each of the levels, current values that correspond to the operation distances of the operating lever are set in an ascending order or in a descending order sequentially from the first level to the nth level.

[5] It is preferable that the operation control system of a working vehicle of the present invention further have the following configuration. The hydraulic pump control unit applies filtering to the current value by a filter where parameters for suppressing a change in the current value are set corresponding to each of the levels. The parameters have values corresponding to magnitudes of changes in the current values in the operation distance/current value corresponding data that corresponds to each of the levels.

[6] It is preferable that the operation control system of a working vehicle of the present invention further have the following configuration. The operation control of the operation unit is a left-side traveling speed control that controls a traveling speed of a left-side traveling device out of a pair of left and right traveling devices that the working vehicle includes, and is also a right-side traveling speed control that controls a traveling speed of a right-side traveling device out of a pair of left and right traveling devices that the working vehicle includes. Levels in n stages ranging from a first level to an nth level (n being an integer of not less than 2) are set as left levels with respect to the traveling speed of the left-side traveling device. Levels in n stages ranging from a first level to an nth level (n being an integer of not less than 2) are set as right levels with respect to the traveling speed of the right-side traveling device. The display unit displays a selection screen that allows an operator to select any level among the left levels in n stages and the right levels in n stages. The operation control system of a working vehicle according to the present invention is provided with a left-side hydraulic motor and a right-side hydraulic motor that are driven by a pressurized oil discharged from the hydraulic pump. The hydraulic pump control unit has left level/current value corresponding data where the current values are set corresponding to each of the levels in the left levels in the n stages. The hydraulic pump control unit has right level/current value corresponding data where the current values are set corresponding to each of the levels in the right levels in the n stages. The hydraulic pump control unit acquires a current value that corresponds to the level, which the operator selects from the left levels in the n stages, from the left level/current value corresponding data, and controls a discharge amount of a pressurized oil for driving the left-side hydraulic motor with respect to the hydraulic pumps based on the acquired current value. The hydraulic pump control unit acquires a current value that corresponds to the level, which the operator selects from the right levels in the n stages, from the right level/current value corresponding data, and controls a discharge amount of a pressurized oil for driving the right-side hydraulic motor with respect to the hydraulic pumps based on the acquired current value.

[7] It is preferable that the operation control system of a working vehicle of the present invention further have the following configuration. Magnitudes of the current values set corresponding to each of the levels of the left level/current value corresponding data are set in an ascending order or in a descending order sequentially from the first level to the nth level. Further, magnitudes of the current values set corresponding to each of the levels of the right level/current value corresponding data are set in an ascending order or in a descending order sequentially from the first level to the nth level.

[8] It is preferable that the operation control system of a working vehicle of the present invention further have the following configuration. The hydraulic pump control unit further performs a proportional integral derivative (PID) control so that the traveling speed of the left-side traveling device and the traveling speed of the right-side traveling device become speeds corresponding to the respectively selected levels.

[9] It is preferable that the operation control system of a working vehicle of the present invention further have the following configuration. The PID control is performed in such a manner that target values that correspond to each of the levels are set with respect to a rotational speed of the left-side hydraulic motor and a rotational speed of the right-side hydraulic motor, and the hydraulic pump is controlled in such a manner that the rotational speed of the left-side hydraulic motor and the rotational speed of the right-side hydraulic motor become the set target values.

Advantageous Effects of the Invention

In the operation control system of a working vehicle according to the present invention, by performing a simple operation where an operator selects a level depending on the skill of the operator or the content of an operation from the selection screen displayed on the display unit, the operator can control a current value outputted by the operation of the operating lever. Accordingly, the operator can operate the operation unit of the working vehicle in a state where the operation speed is limited to a speed corresponding to the selected level.

For example, in a case where an operation control of the operation unit is a traveling speed control of controlling a traveling speed of the traveling device that the working vehicle includes, when the operator selects the lowest level among a plurality of levels, even when an operation distance of the operating lever is the same, the working vehicle travels in a state where the traveling speed is limited to the low speed compared to the normal traveling speed. Accordingly, even an operator who has not enough skill in operating the working vehicle can operate the working vehicle with a margin.

Further, in a case where an operation control of the operation unit is an operation speed control of controlling an operation speed of the working equipment that the working vehicle includes, when the operator selects the lowest level among a plurality of levels, even when an operation distance of the operating lever is the same, the working equipment is operated in a state where the operation speed is limited to the low speed compared to the normal operation speed. Accordingly, even an operator who has not enough skill in operating the working vehicle can operate the working equipment with a margin.

Further, in a case where an operation control of the operation unit is a left-side traveling speed control for controlling a traveling speed of the left-side traveling device out of the pair of left and right traveling devices that the working vehicle includes and a right-side traveling speed control for controlling a traveling speed of the right-side traveling device out of the pair of left and right traveling devices that the working vehicle includes, when a straight-traveling stability of the working vehicle is impaired, the operator can maintain the straight-traveling stability of the working vehicle by performing a simple operation of selecting the desired level among the plurality of levels. Accordingly, even an operator who has not enough skill in operating the working vehicle can perform the operation to maintain the straight-traveling stability of the working vehicle with a margin.

BRIEF DESCRIPTION OF THE DRAWINGS

FIG. 11 is a flowchart describing operation control processing in the operation control system 30C of a working vehicle according to the embodiment 3.

DETAILED DESCRIPTION

Embodiments of the present invention are described with reference to drawings. The respective embodiments described hereinafter illustrate preferred embodiments for carrying out the invention, and are not intended to limit the invention called for in claims. Further, it is not always the case that all of respective components and combinations of these components described in the respective embodiments are indispensable in the present invention. Further, each drawing for describing each embodiment is a drawing that indicates one example, and it is not always the case that these drawings strictly reflect actual shapes, sizes and the like.

An operation control system of a working vehicle described in each of the respective embodiments described hereinafter is an operation control system for a working vehicle that performs an operation control of an operation unit by controlling a hydraulic pump based on a current value corresponding to an operation of an operating lever. With respect to an operation speed when the operation unit is operated, levels at n stages ranging from a first level to an nth level (n being an integer of 2 or more) are set, and a current value is limited corresponding to a level that an operator selects from the levels at n stages. With such a setting, the operation unit of the working vehicle is operated in a state where an operation speed is limited to a speed corresponding to the selected level. Hereinafter, the respective embodiments of the operation control system of the working vehicle are described.

Embodiment 1

In the operation control system of the working vehicle 1 according to the embodiment 1, the above-mentioned "the operation control of the operation unit" is a traveling speed control that controls a traveling speed of a traveling device that the working vehicle includes. Further, the above-mentioned "levels at n stages ranging from the first level to the nth level" are 3 stages consisting of the first level L1, the second level L2 and the third level L3. Hereinafter, the operation control system of the working vehicle 1 according to the embodiment 1 is described.

Figure 1:
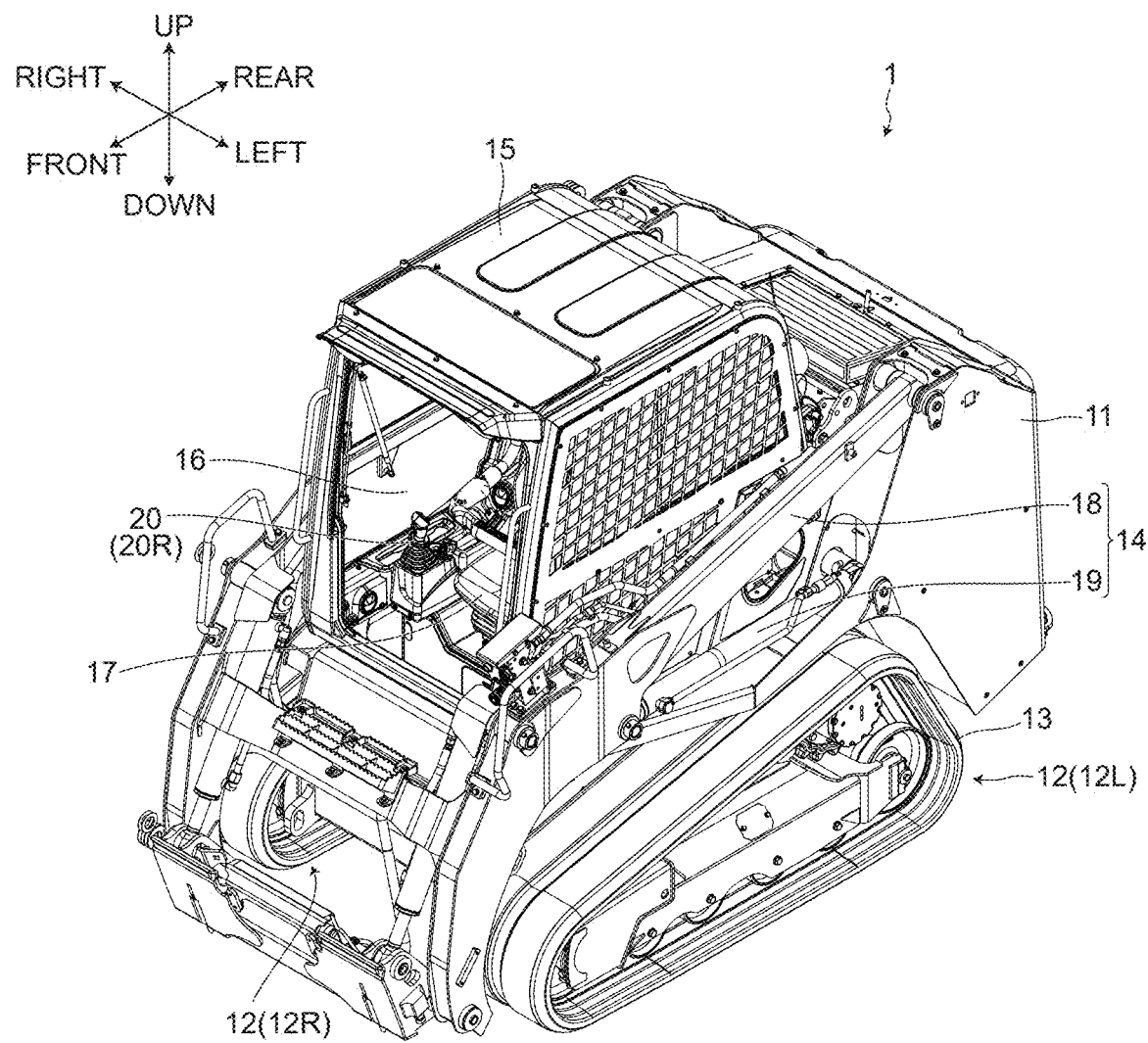
FIG. 1 is a view illustrating a working vehicle 1 to which an operation control system of a working vehicle according to an embodiment 1 is applied.

FIG. 1 is a view illustrating a working vehicle 1 to which an operation control system 30A of a working vehicle according to the embodiment 1 is applied. The working vehicle 1 is described in view of an example where the working vehicle is "a crawler loader" (also referred to as "track loader") and is able to mount an attachment such as a bucket not illustrated in the drawing thereon. The external appearance configuration of the working vehicle 1 does not constitute a subject matter of the present invention, and hence, the external appearance configuration of the working vehicle 1 is only schematically described. Further, the working vehicle 1 illustrated in FIG. 1 is substantially equal to working vehicles according to other embodiments described later.

In the description made hereinafter, with respect to the working vehicle 1, a side on which the attachment such as the bucket is mounted is set as "front", and a side opposite to the side on which the attachment such as the bucket is mounted is set as "rear". Further, a side on a bottom surface of the working vehicle 1 is set as "down", and a side opposite to the bottom surface is set as "up". Further, a side of a left side surface of the working vehicle 1 as viewed from behind the working vehicle 1 is set as "left", and a side of a right side surface of the working vehicle 1 as viewed from behind the working vehicle 1 is set as "right".

As illustrated in FIG. 1, the working vehicle 1 includes: a body frame 11; a pair of left and right traveling devices 12 each mounted on the body frame 11 and having a crawler (endless track) 13; a working equipment 14 mounted on the body device; and a cabin 15 mounted on a center upper portion of the body frame 11. With respect to the pair of left and right traveling devices 12, in a case where the description is made by differentiating the traveling device on the left side and the traveling device on the right side, the description is made by indicating the pair of left and right traveling device 12 as "left side traveling device 12L" and "right side traveling device 12R".

The working equipment 14 is constituted of: arms 18 that are arranged so as to surround the front, rear, left and right sides of the cabin 15; pair of left and right hydraulic cylinders (arm cylinders) 19 that is mounted on the body frame 11 and arms 18 in a straddling manner; and the attachment such as a bucket (not illustrated in the drawing) mounted on distal end portions of the arms 18.

The cabin 15 is formed in a box shape, and a front door (not illustrated in the drawing) that is openable and closeable is mounted on the front side of the working vehicle 1. An operator seat 17 on which an operator is seated in a direction toward the front side of the working vehicle is disposed in the cabin 15. Operating levers 20 are respectively disposed on a left side and a right side of the operator seat 17. Also with respect to the operating levers 20, in a case where the left and right operating levers are described in a differentiated manner, the description is made by setting these operating levers 20 as "left operating lever 20L" and "right operating lever 20R". In FIG. 1, the operating lever 20L disposed on the left side exists at a position that cannot be visually recognized and hence, the operating lever 20L is not illustrated.

In such a configuration, the left operating lever 20L is positioned on the left side when the operator is seated on the operator seat 17, and makes the working vehicle 1 travel. On the other hand, the right operating lever 20R is positioned on the right side when the operator is seated on the operator seat 17. The operating lever 20R is a operating lever for operating the attachment such as the bucket by operating (swinging vertically) the arm 18. In the description made hereinafter, there may be a case where the left operating lever 20L is simply indicated as the operating lever 20L, and the right operating lever 20R is simply indicated as the operating lever 20R.

Subsequently, the operation control system 30A of the working vehicle 1 according to the embodiment 1 is described. The operation control system 30A of the working vehicle according to the embodiment 1, as described previously, performs a traveling speed control of the traveling device 12 that the working vehicle 1 has. Then a plurality of levels are set with respect to the traveling speed of the traveling device 12, and the operation control system 30A performs the traveling speed control that corresponds to the level that the operator selects from the plurality of levels. In such a traveling speed control, as described previously, the levels in 3 stages consisting of the first level L1, the second level L2 and the third level L3 are set as the plurality of levels.

The traveling speed of the traveling device 12 is also the traveling speed of the working vehicle 1. Accordingly, in the operation control system 30A of the working vehicle 1 according to the embodiment 1, there may be a case where "the traveling speed of the traveling device 12" is expressed as "the traveling speed of the working vehicle 1".

Among the first level L1, the second level L2 and the third level L3, the third level L3 is the level set with respect to a normal speed of the working vehicle 1. Accordingly, in a case where the traveling speed is set to the third level L3, the working vehicle 1 travels at the normal speed. The "normal speed" means a speed of a working vehicle 1 which has no function of setting levels. In the description made hereinafter, "the first level L1, the second level L2 and the third level L3" are also expressed as "the first level L1 to the third level L3".

Figure 2:
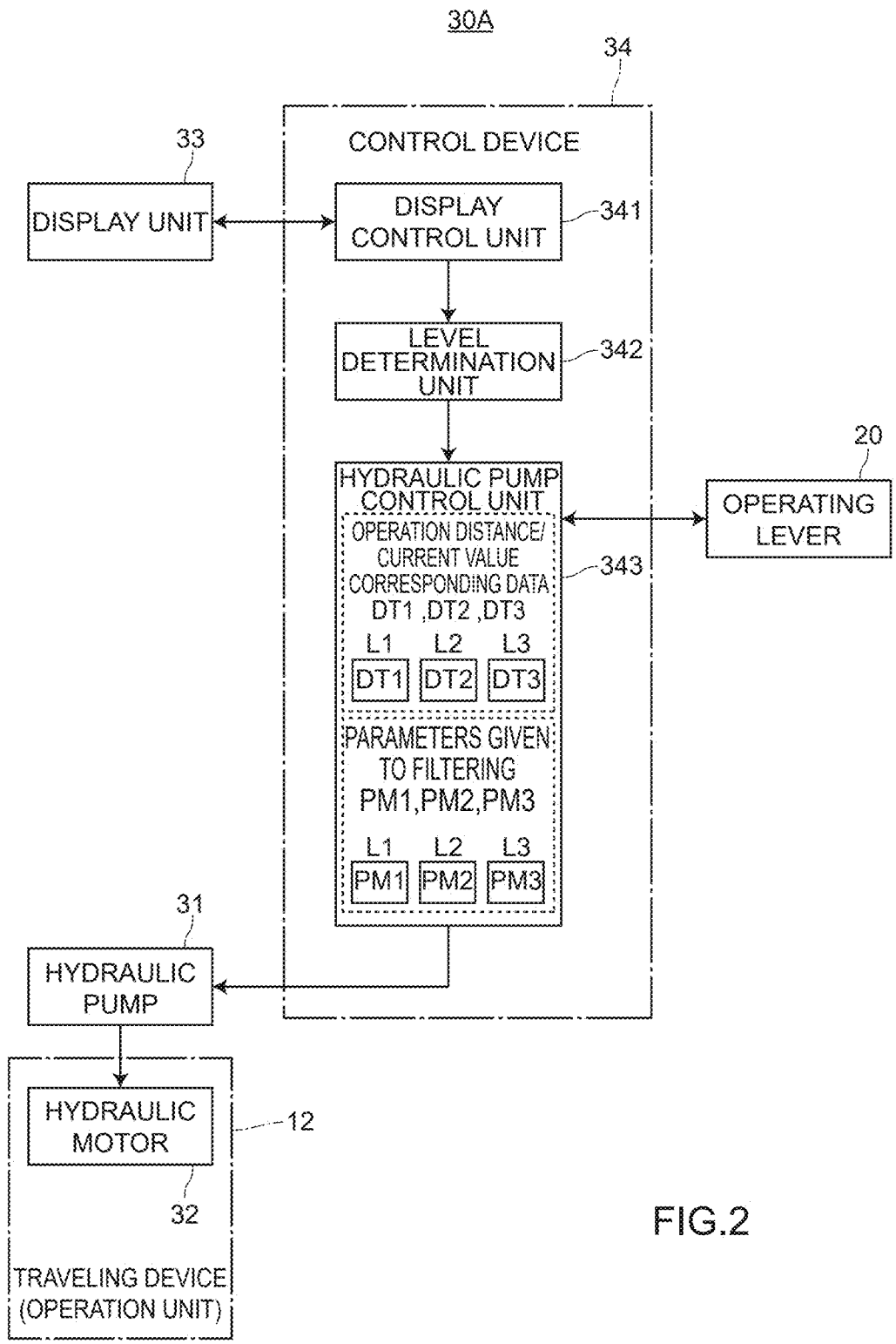
FIG. 2 is a view illustrating an operation control system 30A of a working vehicle according to the embodiment 1.

FIG. 2 is a view illustrating the operation control system 30A of the working vehicle 1 according to the embodiment 1. As described in FIG. 2, the operation control system 30A of the working vehicle 1 according to the embodiment 1 includes: a hydraulic pump 31; a hydraulic motor 32 for traveling that is driven by a pressurized oil discharged from the hydraulic pump 31; a display unit 33 that displays a selection screen 331 (see FIG. 3) provided for allowing the operator to select any level among the first level L1 to the third level L3; and a control device 34 that has a hydraulic pump control unit 343 for controlling the hydraulic pump 31 based on the level selected by the operator.

First, the display unit 33 and the selection screen 331 displayed on the display unit 33 are described and, thereafter, other constitutional components such as the control device 34 are described. The display unit 33 is a touch screen and functions as a user interface that enables inputting of information. The display unit 33 is disposed in the cabin 15 of the working vehicle 1 (see FIG. 1). Further, the display unit 33 is disposed at a position where the operator seated on the operator seat 17 can easily touch the selection screen 331 with his/her finger in the cabin 15.

Figure 3:
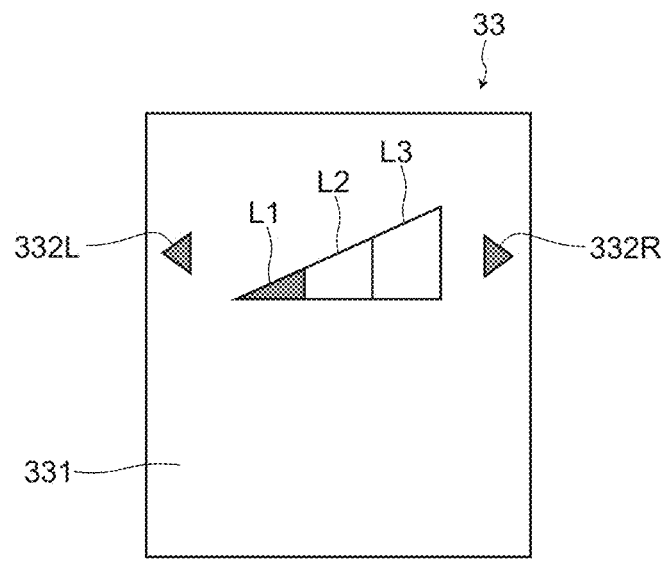
FIG. 3 is a view schematically illustrating one example of a selection screen 331 displayed on a display unit 33.

FIG. 3 is a view schematically illustrating one example of the selection screen 331 displayed on the display unit 33. The selection screen 331 illustrated in FIG. 3 allows the operator to select any level among the levels in 3 stages consisting of the first level L1 to the third level L3.

In the selection screen 331 illustrated in FIG. 3, each time the operator touches a level selection button 332R on a right side illustrated in the drawing, a display segments corresponding to the first level L1 to the third level L3 are sequentially turned on. For example, when the operator touches the level selection button 332R one time, the display segment that corresponds to the first level L1 is turned on so as to indicate that the first level L1 is selected.

When the operator touches the level selection button 332R two times, the display segments that correspond to the first level L1 and the second level L2 are turned on so as to indicate that the second level L2 is selected. When the operator touches the level selection button 332R three times, all display segments that correspond to the first level L1 to the third level L3 are turned on so as to indicate that the third level L3 is selected. In FIG. 3, a state where the display segment of the first level L1 is turned on is illustrated.

Further, each time the operator touches the level selection button 332L on a left side in a state where all display segments that correspond to the first level L1 to the third level L3 are turned on, the display segments that correspond to the first level L1 to the third level L3 are turned off stage by stage.

The operator selects a desired level depending on his/her skill or the content of an operation from the selection screen 331 illustrated in FIG. 3. For example, in a case where the operator wants to make the working vehicle 1 travel at a low speed, the operator selects the first level L1. In a case where the operator wants to make the working vehicle 1 travel at an intermediate speed, the operator selects the second level L2. In a case where the operator wants to make the working vehicle 1 travel at a normal speed, the operator selects the third level L3. With such an operation, the working vehicle 1 travels in a state that the speed of the working vehicle 1 is limited to the speed that corresponds to the selected level. This operation is described later in detail.

Subsequently, the control device 34 is described. As illustrated in FIG. 2, the control device 34 includes a display control unit 341, a level determination unit 342, and a hydraulic pump control unit 343.

The display control unit 341 transmits and receives information between the display control unit 341 and the display unit 33. The level determination unit 342 determines which level among the first level L1 to the third level L3 is selected from the selection screen 331 displayed on the display unit 33.

The hydraulic pump control unit 343 includes "operation distance/current value corresponding data DT1, DT2, DT3" where an operation distance of the operating lever 20L and a current value are made to correspond to each other. In this case, the operation distance/current value corresponding data DT1 corresponds to the first level L1, the operation distance/current value corresponding date DT2 corresponds to the second level L2, and the operation distance/current value corresponding data DT3 corresponds to the third level L3. The detail of these operation distance/current value corresponding data DT1, DT2, DT3 is described later.

The hydraulic pump control unit 343 also applies filtering to a current value by a filter where parameters for suppressing a change in current values are set. The parameters are set corresponding to each of the levels consisting of the first level L1 to the third level L3. In this embodiment, the parameter set corresponding to the first level L1 is a parameter PM1, the parameter set corresponding to the second level L2 is a parameter PM2, and the parameter set corresponding to the third level L3 is a parameter PM3.

The parameter PM1, PM2, PM3 has a value corresponding to magnitude of a change in a current value in the operation distance/current value corresponding data that corresponds to each level (referred to as a parameter value). The parameter value corresponding to a change in a current value is described later.

Subsequently, a description is made with respect to the operation distance/current value corresponding data DT1, DT2, DT3 where an operation distance of the operating lever 20L and a current value are made correspond to each other.

Figure 4:
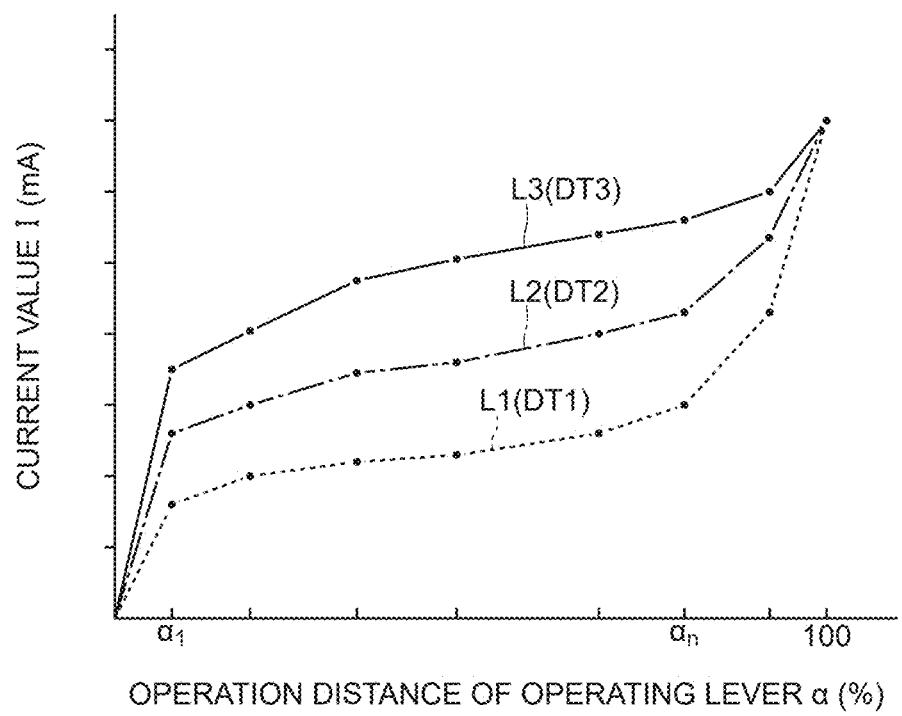
FIG. 4 is a view illustrating a operation distance/current value corresponding data DT1, DT2, DT3.

FIG. 4 is a view illustrating the operation distance/current value corresponding data DT1, DT2, DT3. In FIG. 4, an operation distance α of the operating lever 20L is taken on an axis of abscissas, and a current value I is taken on an axis of ordinates. The current value I is a value that is increased in an upward direction from zero (0) along the axis of ordinates as illustrated in the drawing.

A broken line in FIG. 4, indicates the relationship between the operation distance α of the operating lever 20L at the first level L1 and the current value I, and corresponds to the operation distance/current value corresponding data DT1. A chained line in FIG. 4 indicates the relationship between the operation distance α of the operating lever 20L at the second level L2 and the current value I, and corresponds to the operation distance/current value corresponding data DT2. A solid line in FIG. 4 indicates the relationship between the operation distance α of the operating lever 20L at the third level L3 and the current value I, and corresponds to the operation distance/current value corresponding data DT3.

In this embodiment, the operation distance α of the operating lever 20L is expressed by an inclination angle from a neutral position of the operating lever 20L. In FIG. 4, the inclination angle is expressed by a percentage (%) with respect to a maximum inclination angle of the operating lever 20L.

That is, the operation distance is expressed by percentage (%) with respect to the maximum inclination angle such that, assuming the maximum inclination angle as 100%, the operation distance becomes 10% when the inclination angle is 1/10 of the maximum inclination angle, and the operation distance becomes 50% when the inclination angle is 1/2 of the maximum inclination angle.

As illustrated in FIG. 4, in a zone where the operation distance of the operating lever is relatively small immediately after starting inclining of the operating lever 20L (for example, the zone where the operation distance reaches α1), a change in a current value is large. Thereafter, as the operation distance of the operating lever 20L is increased from the operation distance α1, the current value is gradually increased. Then, when the operation distance of the operating lever 20L exceeds αn, for example, a change in the current value becomes large again. The relationship between the operation distance of the operating lever 20L and the current value illustrated in FIG. 4 is one example, and the relationship is not limited to such a relationship, and can be suitably set.

In this embodiment, with respect to the operation distance/current value corresponding data DT1, DT2, DT3 that correspond to each of the levels consisting of the first level L1 to the third level L3, as illustrated in FIG. 4, magnitude of the current value when the operation distance of the operating lever 20L is the same is set in an ascending order or a descending order sequentially from the first level L1 to the third level L3. In the operation control system 30A of the working vehicle 1 of the embodiment 1, the current value is set in an ascending order. That is, the current values when the operation distance of the operating lever 20L is the same are set such that the current value is increased sequentially from the first level L1 to the third level L3.

In this manner, magnitudes of current values when the operation distance of the operating lever 20L are the same are set in an ascending order of the first level L1 to the third level L3. Accordingly, with respect to the traveling speeds of the working vehicle 1 when the operation distance of the operating lever 20L are the same, the traveling speed when the second level L2 is selected becomes faster than the traveling speed when the first level L1 is selected. In the same manner, when the third level L3 is selected, the traveling speed of the working vehicle 1 becomes further faster. When the third level L3 is selected, the traveling speed becomes a normal speed.

The hydraulic pump control unit 343 acquires a current value that corresponds to an operation distance of the operating lever at the present point of time based on the operation distance/current value data that corresponds to the level that the operator selects. For example, when the operator selects the first level L1, the hydraulic pump control unit 343 acquires a current value corresponding to the operation distance of the operating lever at the present point of time based on the operation distance/current value corresponding data DT1.

As described previously, each of the parameters PM1, PM2, PM3 that are set corresponding to each of the levels has a parameter value corresponding to a magnitude in a change of the current value corresponding to the operation distance of the operating lever 20L. In this embodiment, as illustrated in FIG. 4, a change in the current value corresponding to the operation distance of the operating lever 20L is large in a zone (for example, a zone up to α1) where the operation distance of the operating lever 20L is relatively small and, thereafter, the current value is gradually increased. Then, when the operation distance of the operating lever 20L exceeds αn, for example, a change in the current value becomes large again.

In this manner, a change in the current value corresponding to the operation distance of the operating lever 20L largely differs depending on the operation distance of the operating lever 201 in operation distance/current value corresponding data DT1, DT2, DT3 corresponding to each of the levels. To cope with such a situation, the parameters PM1, PM2, PM3 each have a parameter value corresponding to a change in the operation distance of the operating lever 20L in the operation distance/current value corresponding data that corresponds to each level, that is, the parameter value corresponding to a change in the current value.

To be more specific, the parameter PM1 set with respect to the first level L1 has: a parameter value PM11 that corresponds to, for example, a zone up to an operation distance α1 of the operating lever 20L in FIG. 4 (referred to as a first zone); a parameter value PM12 that corresponds to, for example, a zone up to an operation distance αn exceeding the operation distance α1 of the operating lever 20L in FIG. 4 (referred to as a second zone); and a parameter value PM13 that corresponds to, for example, a zone exceeding the operation distance αn of the operating lever 20L in FIG. 4 (referred to as a third zone).

The parameter PM2 set with respect to the second level L2 has a parameter value PM21 that corresponds to the first zone of the operation quantity of the operating lever 20L, a parameter value PM22 that corresponds to the second zone, and a parameter value PM23 that corresponds to the third zone. Further, the parameter PM3 set with respect to the third level L3 has a parameter value PM31 that corresponds to the first zone, a parameter value PM32 that corresponds to the second zone, and a parameter value PM33 that corresponds to the third zone.

These parameter values PM11 to PM13, parameter values PM21 to PM23 and the parameter values PM31 to PM33 are not illustrated in FIG. 4. In this manner, by performing filtering using the parameter values set for the respective zones of the operation distance of the operating lever 20L, that is, using the parameter values that correspond to a change in current value, the filtering can be performed more properly.

Figure 5:
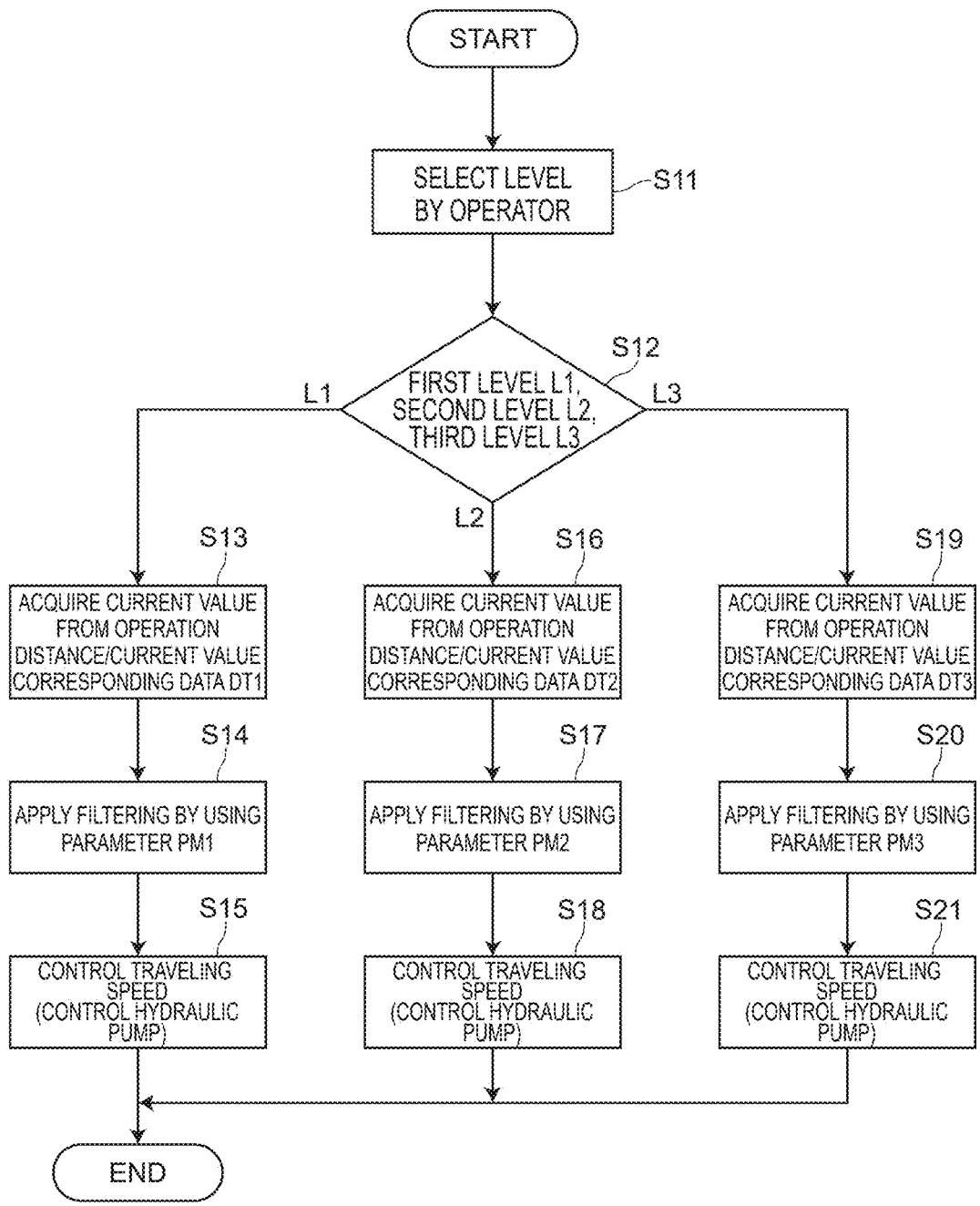
FIG. 5 is a flowchart describing operation control processing in the operation control system 30A of the working vehicle according to the embodiment 1.

FIG. 5 is a flowchart describing operation control processing in the operation control system 30A of the working vehicle 1 according to the embodiment 1. As illustrated in FIG. 5, first, when an operator selects a level from the selection screen 331 of the display unit 33 (see FIG. 3) (step S11), the level determination unit 342 determines which level among the first level L1 to the third level L3 is selected (step S12).

In such processing, in a case where the level determination unit 342 determines that the level that the operator selects is the first level L1, processing in step S13 to step S15 is performed. That is, the hydraulic pump control unit 343 acquires a current value that corresponds to an operation distance of the operating lever 20L at the present point of time from the operation distance/current value corresponding data DT1 that corresponds to the first level L1 (step S13). Then, the hydraulic pump control unit 343 performs filtering with respect to the current value acquired from the operation distance/current value corresponding data DT1 using the parameter PM1 (step S14).

In the filtering using the parameter PM1 in step S14, the filtering using the parameter values PM11, PM12, PM13 that correspond to magnitudes in a change of a current value with respect to an operation distance of the operating lever 20L is performed. By performing such filtering, for example, it is possible to suppress a sudden current change in the zone where a change in a current value is large.

Then, a traveling speed control is performed using the current value to which filtering is applied (step S15). To be more specific, in the processing of the step S15, a discharge amount of a pressurized oil discharged from the hydraulic pump is controlled based on a current value that corresponds to an operation distance of the operating lever 20L at the present point of time. Due to a control of the discharge amount of the pressurized oil that the hydraulic pump 31 discharges, the hydraulic motor 32 is controlled and hence, a traveling speed of the working vehicle 1 is controlled. In this case, the first level L1 is selected by the operator and hence, the operator can make the working vehicle 1 travel at the traveling speed that corresponds to the first level L1.

In such processing, when the level that the operator selects is maintained at the first level L1, each time the operator changes the operation distance of the operating lever 20L, the working vehicle 1 travels at a speed that substantially corresponds to the current value indicated by the broken line in FIG. 4. Accordingly, in the case where the operator selects the first level L1, even when the operation distance of the operating lever 20L is the same, it is possible to make the working vehicle 1 travel in a state where the speed is limited to a low speed compared to the normal speed (the speed when the third level L3 is selected).

The processing described above is the processing in the case where the operator selects the first level L1 from the selection screen 331 of the display unit 33. On the other hand, in a case where the operator selects the second level L2 from the selection screen 331, in the step S12, the level determination unit 342 determines that the selected level is the second L2, and processing in step S16 to step S18 is performed.

That is, the hydraulic pump control unit 343 acquires a current value that corresponds to an operation distance of the operating lever 20L at the present point of time from the operation distance/current value corresponding data DT2 that corresponds to the second level L2 (step S16). Then, filtering is performed using the parameter PM2 (step S17). In the filtering performed using the parameter PM2 in the step S17, the filtering is performed using the parameter values PM21, PM22, PM23 that correspond to magnitudes in a change of current values.

Then, a traveling speed control is performed using the current value to which filtering is applied (step S18). In this case, as the second level L2 is selected by the operator, it is possible to make the working vehicle 1 travel at a traveling speed that corresponds to the second level L2.

In such processing, when the level that the operator selects is maintained at the second level L2, each time the operator changes the operation distance of the operating lever 20L, the working vehicle 1 travels with a change in speed that corresponds to a current value indicated by the dash-dotted line in FIG. 4. Accordingly, in the case where the operator selects the second level L2, even when the operation distance of the operating lever 20L is the same, it is possible to make the working vehicle 1 travel in a state where the traveling speed is limited to a slightly low speed compared to a normal speed (a speed when the third level L3 is selected).

Further, in a case where the operator selects the third level L3 from the selection screen 331 of the display unit 33, in the step S12, the level determination unit 342 determines that the selected level is the third level L3, and processing in step S19 to step S21 is performed.

That is, the hydraulic pump control unit 343 acquires a current value that corresponds to an operation distance of the operating lever 20L at the present point of time from the operation distance/current value corresponding data DT3 that corresponds to the third level L3 (step S19). Then, filtering is performed using the parameter PM3 (step S20). In the filtering performed using the parameter PM3 in the step S20, the filtering is performed using the parameter values PM31, PM32, PM33 that correspond to magnitudes in a change of current values.

Then, a traveling speed control is performed using the current value to which filtering is applied (step S21). In this case, the third level L3 is selected by the operator and hence, it is possible to make working vehicle 1 travel at a normal traveling speed.

In such processing, when the level that the operator selects is maintained at the third level L3, each time the operator changes the operation distance of the operating lever 20L, the working vehicle 1 travels with a change in speed that substantially corresponds to a current value indicated by the solid line in FIG. 4. In this manner, in a case where the operator selects the third level L3, it is possible to make the working vehicle 1 travel at a normal speed.

When the operator changes the selection of the level during traveling of the working vehicle 1 at the selected level, the traveling speed control is instantly switched to a control using a current value that corresponds to the level after level changing. For example, when the first level L1 is selected from the selection screen 331 in a state where the working vehicle 1 is made to travel with a speed at the third level L3, the traveling speed control is instantly switched to a control using a current value at the first level L1.

Accordingly, when the operator sets the first level L1 during an operation of the working vehicle 1 at a normal speed, the traveling speed of the working vehicle is instantly switched to the speed at the first level L1. As an opposite case, when the operator selects the third level L3 during traveling of the working vehicle 1 at a speed using a current value that corresponds to the first level L1, the traveling speed of the working vehicle 1 is instantly switched to a speed at the level L3 (normal speed). In this manner, the traveling speed is instantly switched to the speed after such changing and hence, a highly efficient operation can be performed.

Processing in the step S11 to the step S21 described in accordance with the flowchart illustrated in FIG. 5 is also applicable to a case where the working vehicle 1 travels backward besides the case where the working vehicle 1 travels forward.

As described above, in the operation control system 30A of a working vehicle of the embodiment 1, by allowing an operator to perform a simple operation of selecting a level that conforms to his/her skill or the content of an operation from the selection screen 331 displayed on the display unit 33, it is possible to make the working vehicle 1 travel in a state where the traveling speed is limited to a speed that corresponds to the selected level.

For example, in the case where the first level L1 is selected, even when the operation distance of the operating lever 20L is the same, the working vehicle 1 travels in a state where the traveling speed is limited to a low speed compared to a normal traveling speed (a traveling speed at the third level L3). On the other hand, in the case where the second level L2 is selected, even when the operation distance of the operating lever 20L is the same, the working vehicle 1 travels in a state where the traveling speed is limited to slightly low compared to a normal traveling speed (a traveling speed at the third level L3).

In other words, it can be stated that sensitivity of the operating lever 20L (a response speed when the operating lever 201 is operated) in the case where an operator selects the first level L1 or the second level L2 becomes low compared to sensitivity of the operating lever 20L in a normal case (a case where the third level L3 is selected). Accordingly, an operator who has not enough skill in operation of the working vehicle 1 can make the working vehicle 1 travel with a margin. Even an operator having high proficiency in operation of the working vehicle 1 can also operate the working vehicle 1 with a margin under a situation where the working vehicle 1 is required to be traveled carefully.

Further, in the operation control system 30A of the working vehicle 1 according to the embodiment 1, filtering is applied to a current value using a parameter for suppressing a change in a current value. Accordingly, for example, in a zone where a change in a current value is large, a sudden current change can be suppressed and hence, it is possible to make the working vehicle 1 travel smoothly.

Particularly, immediately after an operator starts tilting of the operating lever 20L from a neutral position, the degree of increase of a current value is large. However, by giving parameters that can suppress a sudden change in a current value in this zone, it is possible to suppress a phenomenon that a traveling speed is suddenly increased when an operator restarts the working vehicle 1 that has been stopped.

In this manner, by applying filtering to a current value using a parameter that can suppress a sudden current change, it is possible to make the working vehicle 1 travel smoothly. On the other hand, even if the filtering is not applied, it is possible to perform a basic control such as making a working vehicle travel at a limited traveling speed by limiting a traveling speed of the working vehicle depending on a skill of an operator or a kind of a work.

Embodiment 2

An operation control system 30B of a working vehicle according to an embodiment 2 is described. In the operation control system 30B of the working vehicle 1 according to the embodiment 2, "an operation control of an operation unit" is an operation speed control of a working equipment that controls an operation speed of the working equipment 14 that the working vehicle 1 includes. In this embodiment, the operation speed control of the working equipment 14 is a control of an operation speed for operating an attachment such as a bucket (not illustrated in the drawings). Further, the above-mentioned "levels at n stages ranging from first level to nth level" are 3 stages consisting of the first level L1, the second level L2 and the third level L3. Still further, the working device 14 is operated by the operating lever 20R disposed on a right side of the operator seat 17 of the working vehicle 1. Hereinafter, the operation control system 30B of the working vehicle 1 according to the embodiment 2 is described.

Figure 6:
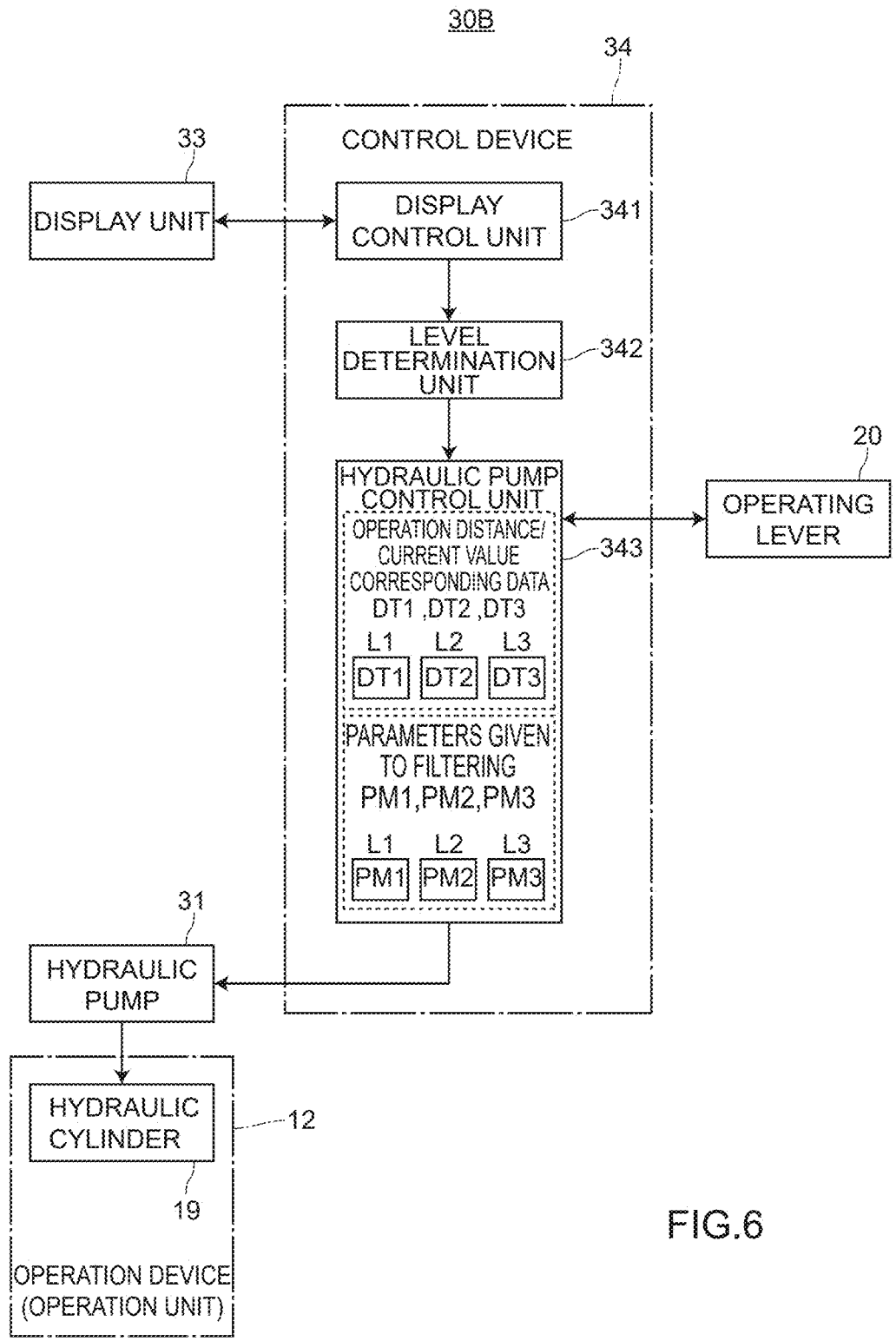
FIG. 6 is a view illustrating an operation control system 30B of a working vehicle according to an embodiment 2.

FIG. 6 is a view illustrating the operation control system 30B of the working vehicle 1 according to the embodiment 2. In the operation control system 30B of the working vehicle 1 according to the embodiment 2, as illustrated in FIG. 6, a hydraulic pump 31 controls a hydraulic cylinders 19. Further, in the operation control system 30B of the working vehicle according to the embodiment 2, a selection screen 333 that allows an operator to select a desired level corresponding to a skill of the operator or the content of an operation is displayed on a display unit 33 (see FIG. 7). First, the selection screen 333 that is displayed on the display unit 33 is described and, thereafter, other constitutional components such as a control device 34 are described.

Figure 7:
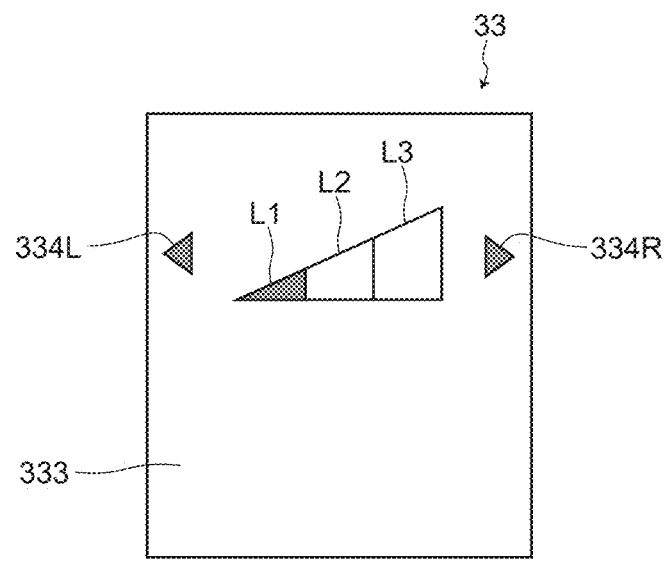
FIG. 7 is a view schematically illustrating one example of a selection screen 333 displayed on the display unit 33.

FIG. 7 is a view schematically illustrating one example of the selection screen 333 displayed on the display unit 33. The selection screen 333 illustrated in FIG. 7 is substantially equal to the selection screen 331 illustrated in FIG. 3. As illustrated in FIG. 7, on the selection screen 333, a level selection button 334L or a level selection button 334R is displayed. When an operator touches the level selection button 334L or the level selection button 334R with his/her finger, the operator can select any level among a first level L1 to a third level L3. The manner of selecting any level among the first level L1 to the third level L3 is substantially equal to the manner of selecting the level on the selection screen 331 illustrated in FIG. 3. In FIG. 7, a state where the first level is selected is illustrated.

The operator selects the desired level depending on the skill of the operator or the content of the operation from the selection screen 333 illustrated in FIG. 7. For example, in a case where the operator wants to operate the attachment at a low speed, the operator selects the first level L1. In a case where the operator wants to operate the attachment at an intermediate speed, the operator selects the second level L2. In a case where the operator wants to operate the attachment at a normal speed, the operator selects the third level L3. With such an operation, the attachment is operated in a state where the operation speed is limited to a speed corresponding to the selected level. Such an operation is described later.

Subsequently, the control device 34 is described with reference to FIG. 6. The control device 34 includes, substantially in the same manner as the operation control system 30A of the working vehicle 1 according to the embodiment 1, a display control unit 341, a level determination unit 342, and a hydraulic pump control unit 343. In such a configuration, the display control unit 341 gives and receives information between the display control unit 341 and the display unit 33. The level determination unit 342 determines which level among the first level L1 to the third level L3 is selected from the selection screen 333 displayed on the display unit 33.

Further, the hydraulic pump control unit 343 acquires a current value with respect to an operation distance of the operating lever at a present point of time from "operation distance/current value corresponding data DT1, DT2, DT3" described in the operation control system 30A of the working vehicle 1 according to the embodiment 1, and controls a discharge amount of a pressurized oil that the hydraulic pump 31 discharges based on the acquired current value. In this case, a pressurized oil that the hydraulic pump 31 discharges controls the hydraulic cylinder 19 for operating the attachment. In the operation control system 30B of the working vehicle according to the embodiment 2, the description is omitted with respect to the operation distance/current value corresponding data DT1, DT2, DT3. However, in the operation control system 30B of the working vehicle 1 according to the embodiment 2, an operation distance in the "operation distance/current value corresponding data DT1, DT2, DT3" is an operation distance of the operating lever 20R.

The hydraulic pump control unit 343 applies, in the same manner as the operation control system 30A of the working vehicle 1 according to the embodiment 1, filtering to the current value by a filter where parameters PM1, PM2, PM3 for suppressing a change in the current value are set. The parameters PM1, PM2, PM3 correspond to each of the levels. The parameters PM1, PM2, PM3, in the same manner as the operation control system 30A of the working vehicle 1 according to the embodiment 1, have parameter values corresponding to magnitudes of changes in the current values in the operation distance/current value corresponding data DT1, DT2, DT3 that correspond to each of the levels.

That is, as described with respect to the operation control system 30A of the working vehicle 1 according to the embodiment 1, the parameter PM1 has: a parameter value PM11 that corresponds to a first zone (a zone up to an operation distance $\alpha 1$ in FIG. 4); a parameter value PM12 that corresponds to a second zone (a zone up to an operation distance $\alpha n$ exceeding the operation distance $\alpha 1$ in FIG. 4); and a parameter value PM13 that corresponds to a third zone (a zone exceeding the operation distance $\alpha n$ in FIG. 4).

In the same manner as the parameter PM1, the parameter PM2 also has parameter values PM21, PM22, PM23 that correspond to the first zone, the second zone, and the third zone. In the same manner as the parameter PM1, the parameter PM3 also has parameter values PM31, PM32, PM33 that correspond to the first zone, the second zone, and the third zone.

Figure 8:
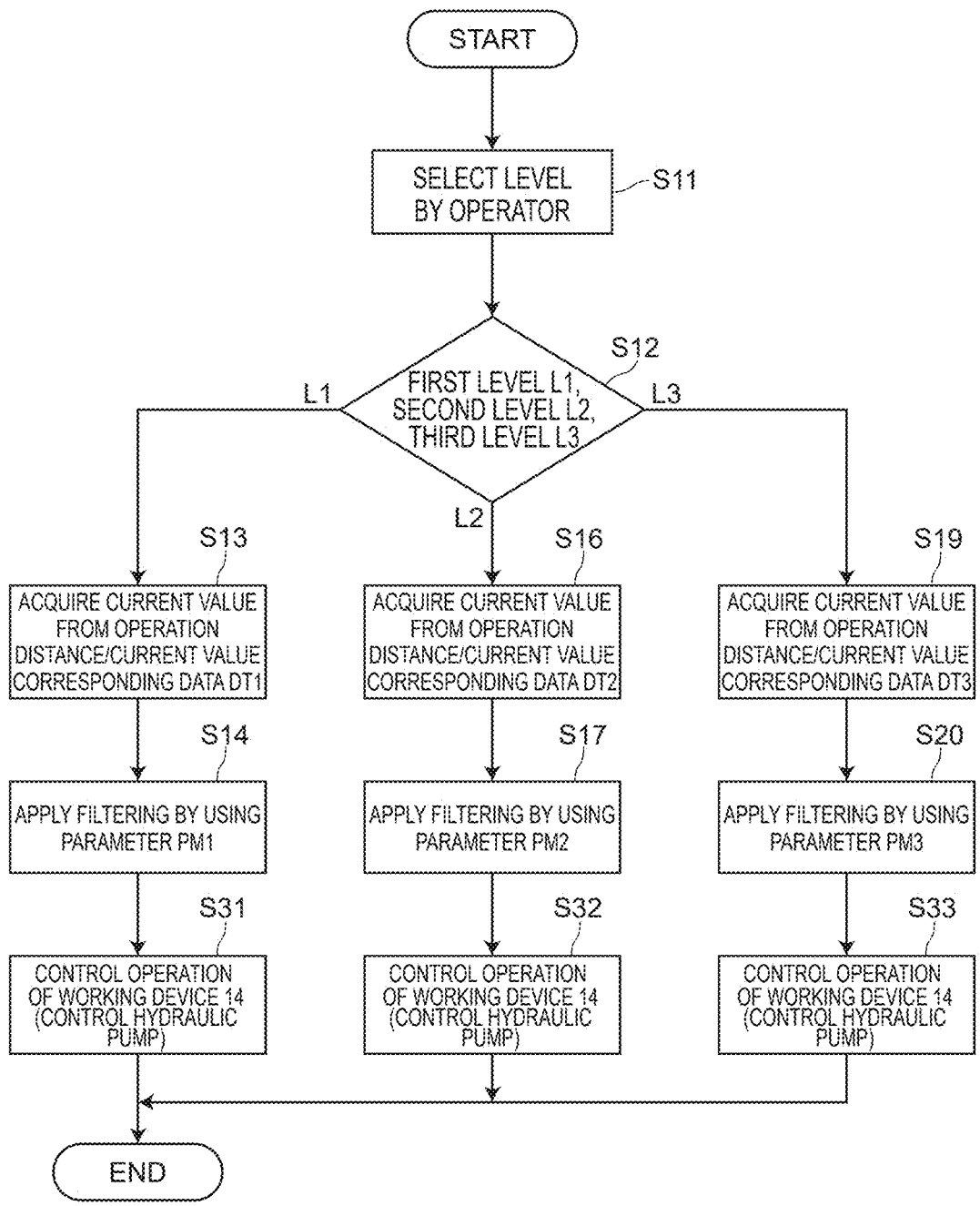
FIG. 8 is a flowchart for describing an operation control processing in the operation control system 30B of a working vehicle according to the embodiment 2.

FIG. 8 is a flowchart for describing an operation control processing in the operation control system 30B of the working vehicle according to the embodiment 2. The operation control processing in the operation control system 30B of the working vehicle 1 according to the embodiment 2 is substantially equal to the operation control processing in the operation control system 30A of the working vehicle 1 according to the embodiment 1.

The operation control processing in the operation control system 30B of the working vehicle according to the embodiment 2 differs from the operation control processing in the operation control system 30A of the working vehicle 1 according to the embodiment 1 with respect to a point that an operation control of the working device 14 (an operation speed control of the attachment) is performed.

The other processing in the operation control system 30B of the working vehicle 1 according to the embodiment 2 are substantially same as the processing in the operation control system 30A of the working vehicle 1 according to the embodiment 1. Accordingly, in the flowchart illustrated in FIG. 8, with respect to steps where the same processing as the corresponding processing in the flowchart illustrated in FIG. 5, the same symbols (symbols such as S11, S12 . . . ) are given.

Hereinafter, the operation control processing in the operation control system 30B of the working vehicle 1 according to the embodiment 2 is described. With respect to the operation control processing in the operation control system 30B of the working vehicle 1 according to the embodiment 2, an operation speed control of the working device 14 is performed in step S31 that succeeds steps S13, S14. Also in step S32 that succeeds steps S16, S17, an operation speed control of the working device 14 is performed. Also in step S33 that succeeds steps S19, S20, an operation speed control of the working device 14 is performed.

For example, in a case where the operator selects the first level L1 from the selection screen 333, the hydraulic pump control unit 343 acquires a current value that corresponds to an operation distance of the operating lever 20R at the present point of time from the operation distance/current value corresponding data DT1 that corresponds to the first level L1 (step S13). Then, the hydraulic pump control unit 343 performs filtering (step S14) with respect to the current value acquired from the operation distance/current value corresponding data DT1 using the parameter PM1. In step S14, in the same manner as the embodiment 1, filtering is performed using the parameter values PM11, PM12, PM13.

Then, an operation speed control of the working device 14 is performed using the current value to which filtering is applied (step S31). To be more specific, a discharge amount of a pressurized oil discharged from the hydraulic pump 31 is controlled based on a current value that corresponds to an operation distance of the operating lever 20R at the present point of time. As described previously, the operation speed control of the working device 14 is an operation speed control at the time of operating the attachment. Accordingly, due to a control of the discharge amount of the pressurized oil that the hydraulic pump 31 discharges, the hydraulic cylinder 19 is controlled and hence, an operation speed of the attachment is controlled. In this case, since the first level L1 is selected by the operator, the operator can operate the attachment at an operation speed that corresponds to the first level L1.

In such processing, when the level that the operator selects is maintained at the first level L1, each time the operator changes the operation distance of the operating lever 20R, the attachment is operated at a speed that substantially corresponds to a current value indicated by the broken line in FIG. 4. Accordingly, in the case where the operator selects the first level L1, even when the operation distance of the operating lever 20R is the same, it is possible to operate the attachment in a state where the operation speed of the attachment is set low compared to a normal speed (a speed when the third level L3 is selected).

The processing described above is the processing in the case where the operator selects the first level L1 from the selection screen 331 of the display unit 33. In this embodiment, in a case where the operator selects the second level L2 from the selection screen 333, processing in step S16, step S17 and step S32 are performed. In this case, as the second level L2 is selected by the operator, the operator can operate the attachment at an operation speed corresponding to the second level L2.

In such processing, when the level that the operator selects is maintained at the second level L2, each time the operator changes the operation distance of the operating lever 20R, the attachment is operated at a speed that substantially corresponds to a current value indicated by the dash-dotted line in FIG. 4. Accordingly, in the case where the operator selects the second level L2, even when the operation distance of the operating lever 20L is the same, it is possible to operate the attachment in a state where the operation speed of the attachment is limited to a slightly low speed compared to a normal speed (a speed when the third level L3 is selected).

Further, when the operator selects the third level L3 from the selection screen 333, processing in step S19, step S20 and step S33 are performed. In this case, the third level L3 is selected by the operator and hence, the operator can operate the attachment at a normal speed.

In such processing, when the level that the operator selects is maintained at the third level L3, each time the operator changes the operation distance of the operating lever 20R, the attachment is substantially operated at a speed corresponding to a current value indicated by the solid line in FIG. 4. In this manner, when the operator selects the third level L3, the operator can operate the attachment at a normal speed.

Also in the operation control system 30B of the working vehicle 1 according to the embodiment 2, when the operator changes the selection of the level, the current value is instantly switched to a current value corresponding to the level after changing the level. For example, when the operator selects the first level L1 in a state where the attachment is operated at a speed of the third level L3 (a normal speed), the operation is instantly switched to a control based on a current value of the first level L1.

Accordingly, when the operator sets the first level L1 during a period in which the attachment is operated at a normal speed, the operation speed of the attachment is instantly switched to the speed at the first level L1. As an opposite case, when the operator selects the third level L3 during a period that the attachment is operated at a speed based on a current value corresponding to the first level L1, the operation speed of the attachment is instantly switched to the speed at the third level L3 (a normal speed). In this manner, the operation speed is instantly switched to the speed after changing the level and hence, a highly efficient operation can be realized.

As described above, according to the operation control system 30B of the working vehicle 1 according to the embodiment 2, by performing a simple control of selecting the level corresponding to a skill of the operator or the content of an operation from the selection screen 333 displayed on the display unit 33, the operator can operate the attachment in a state where the operation speed is limited to the speed corresponding to the selected level.

For example, in a case where the operator selects the first level L1, even when an operation distance of the operating lever 20R is the same, the attachment is operated in a state where the operation speed is limited to a low speed compared to the normal operation speed (the operation speed at the third level L3). Further, in a case where the operator selects the second level L2, even when an operation distance of the operating lever 20R is the same, the attachment is operated in a state where the operation speed is limited to a slightly low speed compared to the normal operation speed (the operation speed at the third level L3).

In other words, it can be stated that sensitivity of the operating lever 20R (a response speed when the operating lever 20R is operated) in the case where the operator selects the first level L1 or the second level L2 becomes low compared to sensitivity of the operating lever 20R in a normal case (a case where the third level L3 is selected). Accordingly, an operator who has not enough skill in operation of the working vehicle can operate the attachment with a margin. Even an operator having high proficiency in operation of the working vehicle 1 can also operate the attachment with a margin under a situation where the attachment is required to be operated carefully.

Also in the embodiment 2, by applying filtering to a current value using a parameter that can suppress a current change, for example, in a zone where a change in a current value is large, it is possible to suppress a sharp current change. Accordingly, the operator can smoothly perform the operation of the attachment. On the other hand, it is possible to perform a basic control such as the operation of the attachment at a limited operation speed by limiting the operation speed of the attachment depending on a skill of an operator or a kind of a work even when filtering is not performed.

Embodiment 3

An operation control system 30C of the working vehicle 1 according to the embodiment 3 is described.

The operation control system 30C of the working vehicle 1 according to the embodiment 3 is an operation control system to allow the working vehicle 1 to maintain a straight-traveling property. That is, there is a case where, even when an operator is operating the working vehicle 1 such that the working vehicle 1 travels straight, the working vehicle 1 is curved in a direction that the operator does not intend. In such a case, the operation control system 30C of the working vehicle 1 according to the embodiment 3 performs a control for maintaining straight-traveling property of the working vehicle 1.

As a reason that impairs straight-traveling property of the working vehicle 1, a case is exemplified where, wear of one crawler out of a pair of left and right crawlers is severe compared to wear of the other crawler. A case is also exemplified where the straight-traveling property is impaired when soil and sand stored in a bucket are largely unevenly distributed in the left-and-right direction in the bucket.

In a control of maintaining straight-traveling property of the working vehicle 1, the respective traveling speeds of the pair of left and right traveling devices that the working vehicle 1 includes, that is, the left-side traveling device 12L and the right-side traveling device 12R, are controlled individually. In the description made hereinafter, the description is made by assuming the traveling speed control of the left-side traveling device 12L as "the left-side traveling speed control" and the traveling speed control of the right-side traveling 12R as "right-side traveling speed control".

Further, in the operation control system 30C of the working vehicle 1 according to the embodiment 3, levels in 10 stages from a first level to a tenth level are set as left levels with respect to a traveling speed of the left-side traveling device 12L. Levels in 10 stages from a first level to a tenth level are set as right levels with respect to a traveling speed of the right-side traveling device 12R.

Figure 9:
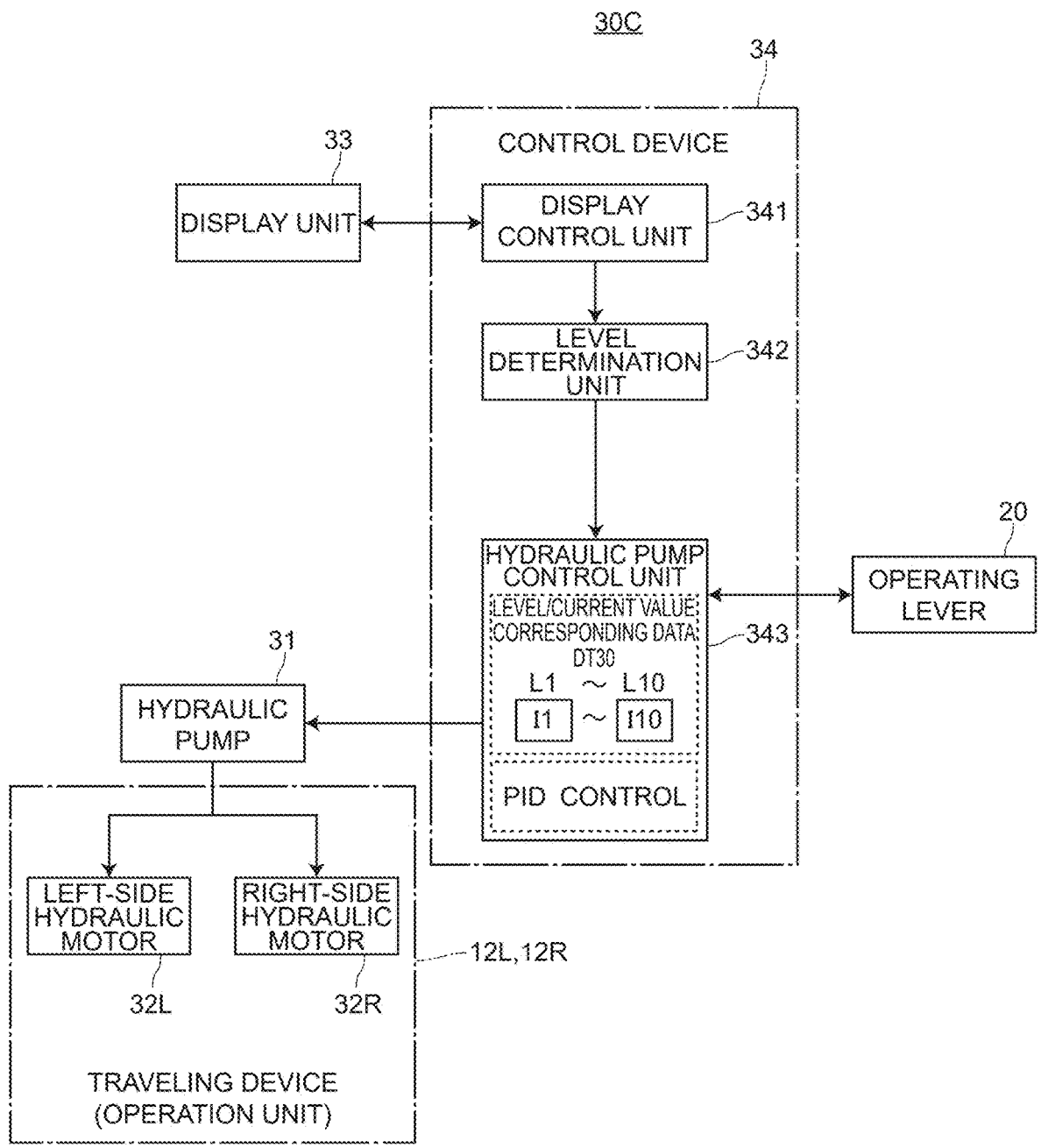
FIG. 9 is a view illustrating an operation control system 30C of a working vehicle according to an embodiment 3.

FIG. 9 is a view illustrating the configuration of the operation control system 30C of the working vehicle 1 according to the embodiment 3. As illustrated in FIG. 9, the operation control system 30C of the working vehicle 1 according to the embodiment 3 includes: the hydraulic pump 31; a left-side hydraulic motor 32L and a right-side hydraulic motor 32R that are driven by a pressurized oil discharged from the hydraulic pump 31; the display unit 33 that displays a display screen 336 (see FIG. 10) for allowing an operator to select any level among the plurality of levels; and the control device 34 having the hydraulic pump control unit 343 that controls the hydraulic pump 31 based on the level that the operator selects.

First, the selection screen 336 displayed on the display unit 33 is described and, thereafter, constitutional components such as the control device 34 are described.

Figure 10:
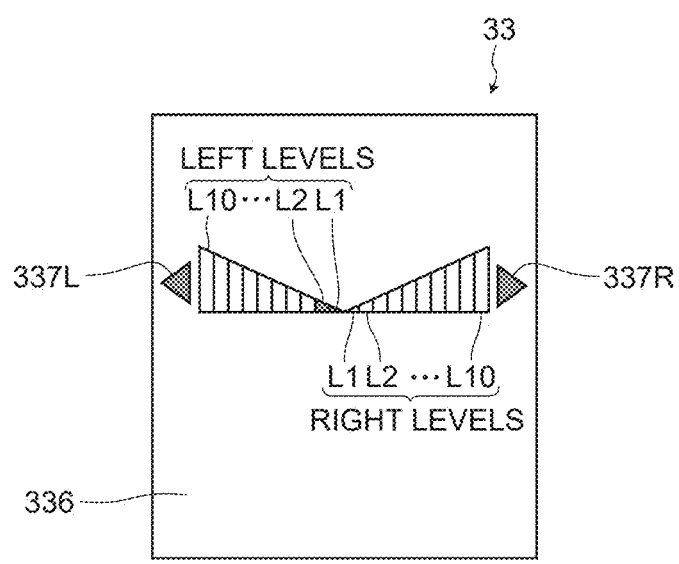
FIG. 10 is a view schematically illustrating one example of a selection screen 336 displayed on the display unit 33.

FIG. 10 is a view schematically illustrating an example of the selection screen 336 displayed on the display unit 33. On the display unit 33, the selection screen 336 is displayed. The selection screen 336 is provided for allowing the operator to set the traveling speed of the left-side traveling device 12L and the traveling speed of the right-side traveling device 12R in plural stages.

As described previously, with respect to the traveling speed of the left-side traveling device 12L, the levels in 10 stages from the first level to the tenth level are set as the left levels.

In the description made hereinafter, the left levels in 10 stages are described as "the left level L1 to the left level L10". Further, with respect to the traveling speed of the right-side traveling device 12R, the levels in 10 stages from the first level to the tenth level are set as the right levels. In the description made hereinafter, the right levels in 10 stages are described as "the right level L1 to the right level L10".

In the selection screen 336 illustrated in FIG. 10, for example, with respect to the selection of the traveling speed of the left-side traveling device 12L, the left level L1 is set when the operator touches a left level selection button 337L one time, and the left level L2 is set when the operator touches the left level selection button 337L two times. Further, the left level L3 is set when the operator touches the left level selection button 337L three times.

In this manner, depending on the number of times that the operator touches the left level selection button 337L, the traveling speed of the left-side traveling device 12L can be set in 10 stages from the left level L1 to the left level L10. In FIG. 10, the case is illustrated where the left level L2 is selected. In this case, a display segment of the left level 1 and a display segment of the left level L2 are turned on.

The selection of the operation speed of the right-side traveling device can be performed in the same manner. Also in this case, depending on the number of times that the operator touches a right level selection button 337R, the traveling speed of the right-side traveling device 12R can be set in 10 stages from the right level L1 to the right level L10.

Subsequently, the control device 34 is described. As illustrated in FIG. 9, the control device 34 in the operation control system 30C of the working vehicle 1 according to the embodiment 3 includes a display control unit 341, the level determination unit 342, and the hydraulic pump control unit 343.

The display control unit 341 transmits and receives information between the display control unit 341 and the display unit 33. The level determination unit 342 determines which level among the left level L1 to the left level L10 is selected from the selection screen 336 and, at the same time, determines which level among the right level L1 to the right level L10 is selected from the selection screen 336 displayed on the display unit 33.

The hydraulic pump control unit 343 has "left level/current value corresponding data" where current values are set corresponding to the respective left levels in 10 stages (the left level L1 to the left level L10), and has "right level/current value corresponding data" where current values are set corresponding to the respective right levels in 10 stages. In FIG. 9, the left level/current value corresponding data and the right level/current value corresponding data are collectively illustrated as "level/current value corresponding data DT30". However, in describing these left level/current value corresponding data and right level/current value corresponding data, the description is made by referring the left level/current value corresponding data as "left level/current value corresponding data 30L" and the right level/current value corresponding data as "right level/current value corresponding data 30R".

In the left level/current value corresponding data 30L, current values I1 to I10 are set corresponding to the respective left levels L1 to L10. Also in the right level/current value corresponding data 30R, in the same manner, current values I1 to I10 are set corresponding to the respective right levels L1 to L10.

The hydraulic pump control unit 343, when the predetermined level is selected from the left level L1 to the left level L10, acquires a current value corresponding to the selected level from the left/level current value corresponding data 30L. Then, the hydraulic pump control unit 343 controls a discharge amount of a pressurized oil for driving the left-side hydraulic motor 32L with respect to the hydraulic pump 31 based on the acquired current value. In this case, by controlling a discharge amount of the pressurized oil of the hydraulic pump 31, the left-side hydraulic motor 32L is controlled.

Further, the hydraulic pump control unit 343, when the predetermined level is selected from the right level L1 to the right level L10, acquires a current value corresponding to the selected level from the right/level current value corresponding data 30R. Then, the hydraulic pump control unit 343 controls a discharge amount of a pressurized oil for driving the right-side hydraulic motor 32R with respect to the hydraulic pump 31 based on the acquired current value. In this case, by controlling a discharge amount of the pressurized oil of the hydraulic pump 31, the right-side hydraulic motor 32R is controlled.

In such processing, a current value with respect to the left-side traveling device 12L is set in an ascending order or in a descending order sequentially from the left level L1 to the left level L10. In the operation control system 30C of the working vehicle 1 according to the embodiment 3, the current value with respect to the left-side traveling device 12L is set in a descending order. That is, a current control is applied to the current values I1 to I10 that correspond to each of the levels from the left level L1 to the left level L10 such that the current values I1 to I10 sequentially becomes smaller as the level is raised. The current value with respect to the right-side traveling device 12R is set in a descending order sequentially from the right level L1 to the right level 10. That is, a current control is applied to the current values I1 to I10 such that the current values I1 to I10 that correspond to each of the levels from the right level L1 to the right level L10 sequentially become smaller as the level is raised.

For example, the description is made by taking the left level as an example. In this case, to facilitate the understanding of the description, it is assumed that the current values that correspond to each of the levels from the left level L1 to the left level L10 are decreased 10% by 10% with respect to a current value at the time of normal traveling (assuming as the current value of 100%). That is, the current value I1 at the left level L1 is 90% of the current value at the time of normal traveling, and the current value I2 at the left level L2 is 80% of the current value at the time of normal traveling. The same goes for the right levels. That is, the current values are decreased 10% by 10% with respect to a current value I1 at the time of normal traveling. Although the case is exemplified where the current value is decreased 10% by 10%, a decrease ratio is not limited to 10%.

In this manner, magnitudes of the current values corresponding to each of the levels from the left level L1 to the left level L10 and magnitudes of the current values corresponding to each of the levels from the right level L1 to the right level L10 are set in a descending order. Accordingly, by increasing each of the levels by one stage by one stage, the current value is sequentially decreased.

The hydraulic pump control unit 343 controls the discharge amount of a pressurized oil with respect to the hydraulic pump 31 based on the current values to which a current control is applied as described above. For example, when the left level L1 is set on the selection screen 336, the hydraulic pump control unit 343 controls the discharge amount of a pressurized oil of the hydraulic pump 31 at the current value 10% smaller compared to the current value at a normal speed (assuming as the current value of 100%). Accordingly, the left-side hydraulic motor 32L is controlled so that the speed of the left-side traveling device 12L is lowered compared to the speed of the right-side traveling device 12R by an amount of 10% in terms of a current value. Accordingly, the working vehicle 1 is slightly curved in the left direction.

Further, when the right level L7 is set on the selection screen 336, the hydraulic pump control unit 343 controls the discharge amount of a pressurized oil of the hydraulic pump 31 at the current value 70% smaller compared to the current value at a normal speed (assuming as the current value of 100%). Accordingly, the right-side hydraulic motor 32R is controlled so that the speed of the right-side traveling device 12R is lowered compared to the speed of the left-side traveling device 12L by an amount of 70% in terms of current value. Accordingly, the working vehicle 1 is largely curved in the right direction.

In the above-mentioned example, the case is exemplified where the current values change at a uniform ratio at each of the levels, that is, where the current values change linearly between the left level L1 to the left level L10 and between the right level L1 to the right level L10. However, the present invention is not limited to such a case. For example, the current values may be set so as to change in a such manner that they draw an exponential curve between the left level L1 to the left level L10 and between the right level L1 to the right level L10. As one example, the current values may adopt a change mode where the current values are largely decreased by drawing a relatively steep curve from the left level L1 to a predetermined level and from the right level L1 to a predetermined level and, thereafter, the current values are gradually decreased by drawing a gentle curve.

The hydraulic pump control unit 343 performs a PID control such that the traveling speed of the left-side traveling device 12L and the traveling speed of the right-side traveling device 12R respectively take speeds corresponding to the selected levels. To be more specific, target values that correspond to each of the levels are set with respect to a rotational speed of the left-side hydraulic pump 32L. Then, the hydraulic pump 31 is controlled such that a rotational speed of the left-side hydraulic pump 32L becomes the set target values. Further, target values that correspond to each of the levels are also set with respect to a rotational speed of the right-side hydraulic pump 32R. Then, the hydraulic pump 31 is controlled such that a rotational speed of the right-side hydraulic pump 32R becomes the set target values. By performing such a PID control, when the working vehicle 1 changes its advancing direction, the deviations from the target values can be decreased so that the working vehicle 1 can curve with a more accurate trajectory.

FIG. 11 is a flowchart describing the operation control processing in the operation control system 30C of the working vehicle 1 according to the embodiment 3. The control performed by the operation control system 30C of the working vehicle 1 according to the embodiment 3 is described with reference to FIG. 11. First, the description is made with respect to a case where the working vehicle 1 is being curved in a right direction because of a certain cause when the operator intends to perform straight traveling. In this case, the operating lever is in a straight advancing state.

First, when the operator selects the level from the selection screen 336 (see FIG. 10) (step S41), the level determination unit 342 determines whether or not the operator selects any one of the left level L1 to the L10 (step S42). In this case, the working vehicle 1 is being curved in a right direction and hence, the operator selects any one of the left level L1 to the left level L10. Accordingly, in step S42, the level determination unit 342 determines that the operator selects any one of the left level L1 to the left level L10. In this operation control processing, it is assumed that the operator selects the left level L1 on the selection screen 336.

Subsequently, a determination is made whether the operation performed by the operating lever 20L is for forward travel or reverse travel of the working vehicle 1 (step S43). In a case where the operation of the operating lever 20L is for either forward travel or reverse travel as a result of the determination in step S43, a current value control that corresponds to the selected level is performed with respect to the left-side traveling device 12L (step S44). In this case, as the left level L1 is selected, the "current value control that corresponds to the level" in step S44 is set to, for example, a current value that is 10% small with respect to a current value in a normal speed (a current value of 100%). Further, the PID control is performed together with the current value control in step S44 (step S45). The PID control, as described previously, is performed so as to set a rotational speed of the left-side hydraulic motor 32L to a target value. Then, a left-side traveling speed control is performed by the current value control and the PID control (step S46).

In this manner, the left-side traveling speed control is performed by the current value control and the PID control. At this point of time, due to the current value control, the current value in the left-side traveling speed control is set 10% small compared to the current value in the right-side traveling device 12R and hence, the traveling speed of the left-side traveling device 12L is decreased by such an amount. Accordingly, the working vehicle 1 that is being curved in a right direction changes its advancing direction in a left direction and advances in the direction acquired by such a change. Further, by performing the PID control in addition to the current value control, when the working vehicle 1 changes its advancing direction in the left direction, the deviation from the target value can be reduced so that the working vehicle 1 can curve with more accurate trajectory.

By performing the processing in steps S41 to S46, the working vehicle 1 that is being curved in the right direction can change its advancing direction in the left direction. As a result, the working vehicle 1 can correct its advancing direction. In performing the correction of the advancing direction, the operator can suitably change the level by touching the selection screen 336 while determining the degree of correction of the advancing direction of the working vehicle 1. For example, in a case where the curving of the traveling vehicle 1 is too small as a result of the correction of the advancing direction of the traveling vehicle 1, the operator suitably increases the level and observes a curving mode. On the other hand, in a case where the curving of the traveling vehicle 1 is too large as a result of the correction of the advancing direction of the traveling vehicle 1, the operator suitably decreases the level and observes a curving mode.

On the other hand, also in a case where the working vehicle 1 is curving in a left direction, the correction of the advancing direction can be performed in the same manner. In this case, the operator selects any one level among the right level L1 to the right level L10 from the selection screen 336. Accordingly, in step S42, the determination is made that the level is none of the left level L1 to the left level L10 and hence, the processing advances to step S47.

In step S47, the determination is made whether the level that the operator selects is any one among the right levels L1 to the right level L10. In this processing, it is assumed that the right level L7 is selected on the selection screen 336. Subsequently, the determination is made whether the operation performed by the operating lever 20L is for either forward travel or reverse travel of the working vehicle 1 (step S48).

As a result of the determination in made in step S48, in a case where the operation of the operating lever 20L is for either forward travel or reverse travel, a current value control that corresponds to the selected level is performed with respect to the right-side traveling device 12R (step S49). In this case, since the right level L7 is selected, the "current value control that corresponds to the level" in step S49 is set to a current value that is 70% smaller compared to a current value in a normal speed (a current value of 100%). Further, a PID control is performed together with the current value control in step S49 (step S50). In the PID control, as described previously, the control is performed so as to set a rotational speed of the right-side hydraulic motor 32R to a target value. Then, a right-side traveling speed control is performed by the current value control and the PID control (step S51).

In this manner, the right-side traveling speed control is performed by the current value control and the PID control. In the right-side traveling speed control at this point of time, since the current value in the right-side traveling device 12R is set 70% smaller compared to the current value in the left-side traveling device 12L, the traveling speed of the right-side traveling device 12R is decreased by such an amount. Accordingly, the working vehicle 1 that is being curved in a left direction changes its advancing direction in a right direction and advances in the direction. Further, by performing the PID control in addition to the current value control, when the working vehicle 1 changes its advancing direction in the right direction, the deviation from the target value can be reduced so that the working vehicle 1 can curve with more accurate trajectory.

By performing the processing in steps S41, S42 and S47 to S51, the working vehicle 1 that is being curved in the left direction can change its advancing direction in the right direction. As a result, the working vehicle 1 can correct its advancing direction. In performing the correction of the advancing direction, the operator can suitably change the level by touching the selection screen 336 while determining the degree of correction of the advancing direction of the working vehicle 1. For example, in a case where the curving of the traveling vehicle 1 is too small as a result of the correction of the advancing direction of the traveling vehicle 1, the operator suitably increases the level and observes a curving mode. On the other hand, in a case where the curving of the traveling vehicle 1 is too large as a result of the correction of the advancing direction of the traveling vehicle 1, the operator suitably decreases the level and observes a curving mode.

In a case where the determination is made that the level that the operator selects is none of the left level 1 to the left level 10 in step S42 in the flowchart illustrated in FIG. 11, and also the determination is made that the level that the operator selects is none of the right level 1 to the right level 10 in step S47, in the flowchart illustrated in FIG. 11, the processing advances to step S52. In step S52, processing for maintaining the straight traveling property is invalid, and the processing returns to step S42. Further, in step S43 and step S48, also in a case where the determination is made that the operating lever 20L is neither forward travel nor reverse travel, the processing for maintaining straight traveling property is invalid and the processing returns to step S42.

As has been described above, in the operation control system 30C of the working vehicle 1 according to the embodiment 3, in a case where there is a concern that the straight traveling property of the working vehicle 1 is impaired, it is possible to maintain straight traveling property of the working vehicle 1. Further, with respect to the operation for straight traveling property of the working vehicle 1, it is sufficient to perform the operation of suitably selecting the level displayed on the selection screen 336 while determining the advancing direction of the working vehicle. Accordingly, an operator who has not enough skill in operation of a working vehicle of this type can perform an operation of maintaining straight traveling property of the working vehicle 1 with a margin.

Further, in the operation control system 30C of the working vehicle 1 according to the embodiment 3, by performing the PID control in addition to the current value control, when the working vehicle 1 changes its advancing direction, the deviation from the target value can be reduced so that the working vehicle 1 can curve with more accurate trajectory. On the other hand, it is possible to perform a basic control such as maintaining the straight traveling performance of the working vehicle 1 even when a PID control is not performed.

The present invention is not limited to the above-mentioned embodiments, and various modifications are conceivable without departing from the subject matter of the present invention. For example, the following modifications are conceivable.

(1) With respect to the display unit 33 illustrated in FIG. 3, FIG. 7 and FIG. 10, the case is described where the selection screens 331, 333, 336 displayed in the respective embodiments are separately displayed. However, the present invention is not limited to such a configuration. For example, the selection screens 331, 333, 336 that are displayed in the respective embodiments can be displayed on one same screen. In this case, it is possible to perform various settings described in the respective embodiments from one selection screen.

(2) In the embodiment 1, the case is exemplified where when the operation distance of the operating lever 20L is the same, magnitudes of current values are set in an ascending order sequentially from the first level L1 to the third level L3 as illustrated in FIG. 4. However, the present invention is not limited to such a case, and a case opposite to such a case may be adopted. That is, when the operation distance of the operating lever 20L is the same, the magnitudes of current values are set in a descending order sequentially from the first level L1 to the third level L3. In this case, the working vehicle 1 travels with a lowest speed at the third level L3 and travels with a highest speed (a normal speed) at the first level L1.

(3) In the embodiment 2, the case is exemplified where when the operation distance of the operating lever 20R is the same, magnitudes of current values are set in an ascending order sequentially from the first level L1 to the level L3 as illustrated in FIG. 4. However, the present invention is not limited to such a case, and a case opposite to such a case may be adopted. That is, when the operation distance of the operating lever 20R is the same, magnitudes of current values are set in a descending order sequentially from the first level L1 to the level L3. In this case, the attachment is operated with a lowest speed at the third level L3 and is operated with a highest speed (a normal speed) at the first level L1.

(4) In the embodiment 1 and the embodiment 2, the levels that the operator can select are set in three stages from the first level L1 to the third level L3. However, the number of levels is not limited to three stages, and the level may be selected from more than three stages. However, to take into account the usability of an operator and the ease of control, assuming the number of the levels as n (n being a positive integer), it is preferable that n fall within a range of $2 \leq n \leq 5$.

(5) In the embodiment 3, the case is exemplified where the current values that correspond to each of the levels from the left level L1 to the left level L10 change in a descending order sequentially from the left level L1 to the left level L10. That is, the case is exemplified where the current values that correspond to each of the levels from the left level L1 to the left level L10 sequentially change smaller as the level is elevated. However, the present invention is not limited to such current setting, and the currents may be set in an opposite way. That is, the current values that correspond to each of the levels from the left level L1 to the left level L10 change in an ascending order. In this case, as the level is elevated, the current value is increased. the same goes for the right level L1 to the right level L10.

(6) In the embodiment 3, the case is exemplified where the left levels and the right levels are set in 10 stages respectively. However, the number of stages is not limited to 10 stages. In this case, also to take into account the usability of an operator and the ease of control, assuming the number of the levels as n (n being a positive integer), it is preferable that n fall within a range of $5 \leq n \leq 15$.

The invention claimed is:

1. An operation control system of a working vehicle that performs an operation control of an operation unit, the operation control system comprising:
    a hydraulic pump configured to control the operation unit of the working vehicle by discharging pressurized oil based on a current value corresponding to an operation of an operating lever;
    a display configured to:
        display a selection screen on the display for allowing an operator to select an operation skill level among a plurality of operation skill levels of the operator as a selected operation skill level, the operation skill level corresponding to a level of the operator's skill level for operating the working vehicle; and
        display the selected operation skill level on the display; and
    a control device having a hydraulic pump controller, the hydraulic pump controller being configured to:
        receive the selected operation skill level;
        receive a degree of the operation of the operating lever;
        select the current value based on the selected operation skill level and the degree of the operation of the operating lever; and
        control a discharge amount, corresponding to the current value, of the pressurized oil from the hydraulic pump such that the operation unit of the working vehicle is controlled.

2. The operation control system of the working vehicle according to claim 1, further comprising:

a hydraulic motor configured to be driven by the pressurized oil discharged from the hydraulic pump to move a traveling device, which the working vehicle includes, as the operation unit, wherein the operation control of the operation unit is a traveling speed control that controls a traveling speed of the traveling device, and the plurality of operation skill levels correspond to a plurality of the traveling speeds of the traveling device, and the hydraulic pump controller is further configured to:
have operation distance/current value corresponding data, in which an operation distance of the operating lever and the current value are made to correspond to each other, corresponding to each level of the plurality of operation skill levels;

acquire the current value that corresponds to the operation distance of the operating lever at a present point of time based on the operation distance/current value corresponding data corresponding to the selected operation skill level; and control the discharge amount of the pressurized oil that the hydraulic pump discharges based on the current value.

3. The operation control system of the working vehicle according to claim 2, wherein
in the operation distance/current value corresponding data, the current values that correspond to the operation distances of the operating lever are set in an ascending order or in a descending order sequentially within the plurality of operation skill levels.

4. The operation control system of the working vehicle according to claim 2, wherein
the hydraulic pump controller is further configured to perform filtering to the current value by a filter where parameters for suppressing a change in the current value are set corresponding to each level of the plurality of operation skill levels, and
the parameters have values corresponding to magnitudes of changes in the current values in the operation distance/current value corresponding data.

5. The operation control system of the working vehicle according to claim 1, further comprising:
a hydraulic cylinder configured to be driven by the pressurized oil discharged from the hydraulic pump to move a working device, which the working vehicle includes, as the operation unit, wherein
the operation control of the operation unit is an operation speed control that controls an operation speed of the working device, and the plurality of operation skill levels correspond to a plurality of the operation speeds of the working device, and
the hydraulic pump controller is further configured to:
have operation distance/current value corresponding data, in which an operation distance of the operating lever and the current value are made to correspond to each other, corresponding to each level of the plurality of operation skill levels;

acquire the current value that corresponds to the operation distance of the operating lever at a point of time based on the operation distance/current value corresponding data corresponding the selected operation skill level; and control the discharge amount of the pressurized oil that the hydraulic pump discharges based on the current value.

6. The operation control system of the working vehicle according to claim 5, wherein in the operation distance/current value corresponding data, the current values that correspond to the operation distances of the operating lever are set in an ascending order or in a descending order sequentially within the plurality of operation skill levels.

7. The operation control system of the working vehicle according to claim 5, wherein
the hydraulic pump controller is further configured to perform filtering to the current value by a filter where parameters for suppressing a change in the current value are set corresponding to each level of the plurality of operation skill levels, and
the parameters have values corresponding to magnitudes of changes in the current values in the operation distance/current value corresponding data.

8. The operation control system of the working vehicle according to claim 1, further comprising:
a left-side hydraulic motor configured to be driven by the pressurized oil discharged from the hydraulic pump to move a left-side traveling device out of a pair of left and right traveling devices that the working vehicle includes as the operation unit; and
a right-side hydraulic motor configured to be driven by the pressurized oil discharged from the hydraulic pump to move a right-side traveling device out of the pair of left and right traveling devices as the operation unit, wherein
the operation control of the operation unit is a left-side traveling speed control that controls a traveling speed of the left-side traveling device and is also a right-side traveling speed control that controls a traveling speed of the right-side traveling device,
the plurality of operation skill levels correspond to each of left levels with respect to the traveling speed of the left-side traveling device and right levels with respect to the traveling speed of the right-side traveling device,
the display is configured to display the selection screen for allowing the operator to select one level among the left levels and the right levels,
the hydraulic pump controller is further configured to:
have left level/current value corresponding data where the current values are set corresponding to each level of the left levels as the plurality of operation skill levels; and
have right level/current value corresponding data where the current values are set corresponding to each level of the right levels as the plurality of operation skill levels,
the hydraulic pump controller is further configured to:
acquire the current value that corresponds to the selected operation skill level from the left level/current value corresponding data; and
control the discharge amount of the pressurized oil for driving the left-side hydraulic motor with respect to the hydraulic pump based on the current value, and
the hydraulic pump control controller is further configured to:
acquirer the current value that corresponds to the selected operation skill level from the right level/current value corresponding data; and
control the discharge amount of the pressurized oil for driving the right-side hydraulic motor with respect to the hydraulic pumps based on the current value.

9. The operation control system of the working vehicle according to claim 8, wherein
magnitudes of the current values set corresponding to each level of the left levels of the left level/current value corresponding data are set in an ascending order or in a descending order sequentially within the plurality of operation skill levels, and magnitudes of the current values set corresponding to each level of the right levels of the right level/current value corresponding data are set in an ascending order or in a descending order sequentially within the plurality of operation skill levels.

10. The operation control system of the working vehicle according to claim 9, wherein the hydraulic pump controller is further configured to perform a proportional integral derivative control such that the traveling speed of the left-side traveling device becomes a speed corresponding to the selected operation skill level and the traveling speed of the right-side traveling device becomes a speed corresponding to the selected operation skill level.

11. The operation control system of the working vehicle according to claim 10, wherein the proportional integral derivative control is performed to control the hydraulic pump so that target values, which correspond to each level of the plurality of operation skill levels, are set with respect to a rotational speed of the left-side hydraulic motor and a rotational speed of the right-side hydraulic motor such that the rotational speed of the left-side hydraulic motor and the rotational speed of the right-side hydraulic motor become the target values, respectively.

12. The operation control system of the working vehicle according to claim 8, wherein the hydraulic pump controller is further configured to perform a proportional integral derivative control such that the traveling speed of the left-side traveling device becomes a speed corresponding to the selected operation skill level and the traveling speed of the right-side traveling device becomes a speed corresponding to the selected operation skill level.

13. The operation control system of the working vehicle according to claim 12, wherein the proportional integral derivative control is performed to control the hydraulic pump so that target values, which correspond to each level of the plurality of operation skill levels, are set with respect to a rotational speed of the left-side hydraulic motor and a rotational speed of the right-side hydraulic motor such that the rotational speed of the left-side hydraulic motor and the rotational speed of the right-side hydraulic motor become the target values, respectively.

* * * * *